(12) United States Patent
Murata

(10) Patent No.: US 7,590,146 B2
(45) Date of Patent: Sep. 15, 2009

(54) INFORMATION PROCESSING UNIT

(75) Inventor: Hiroyuki Murata, Kyoto (JP)

(73) Assignee: Panasonic Corporation, Osaka (JP)

( * ) Notice: Subject to any disclaimer, the term of this patent is extended or adjusted under 35 U.S.C. 154(b) by 714 days.

(21) Appl. No.: 11/044,606

(22) Filed: Jan. 28, 2005

(65) Prior Publication Data

US 2005/0169304 A1  Aug. 4, 2005

(30) Foreign Application Priority Data

Jan. 30, 2004  (JP) .................. P.2004-024161

(51) Int. Cl.
- H04J 3/16 (2006.01)
- H04J 3/22 (2006.01)
- G06F 13/32 (2006.01)
- G06F 13/20 (2006.01)
- G06F 13/36 (2006.01)

(52) U.S. Cl. ............ 370/466; 370/467; 370/545; 710/306; 710/313; 710/315

(58) Field of Classification Search ........ 370/466; 710/315
See application file for complete search history.

(56) References Cited

U.S. PATENT DOCUMENTS

| | | | | |
|---|---|---|---|---|
| 6,301,632 B1 * | 10/2001 | Jaramillo | .............. | 710/105 |
| 6,401,159 B1 * | 6/2002 | Wang | .............. | 710/315 |
| 7,240,141 B2 * | 7/2007 | Ning et al. | .............. | 710/309 |
| 2006/0080492 A1 * | 4/2006 | Choi et al. | .............. | 710/315 |

FOREIGN PATENT DOCUMENTS

| | | |
|---|---|---|
| JP | 06-348647 | 12/1994 |
| JP | 2002-033723 | 1/2002 |

OTHER PUBLICATIONS

Japanese Office Action, with English translation, issued in Japanese Patent Application No. 2004-024161, mailed Jun. 16, 2009.

\* cited by examiner

*Primary Examiner*—Jayanti K Patel
*Assistant Examiner*—Christopher M Crutchfield
(74) *Attorney, Agent, or Firm*—McDermott Will & Emery LLP

(57) ABSTRACT

The object of the invention is to enhance data transmission efficiency by considering a clock frequency, a data transmission method and a data storage method. To achieve the object, an information processing unit according to the invention is provided with a bus on which a data transmission signal is transmitted from the side of a master (a transmission source) to the side of a slave (a transmission destination), another bus on which a data transmission completion signal is transmitted from the slave's side to the master's side, the other bus on which a data signal is transmitted from the master's side to the slave's side, a functional block for converting a protocol on the master's side to a protocol on the slave's side, another functional block for converting the protocol on the slave's side to the protocol on the master's side, registers controlled by a clock on the master's side, registers controlled by a clock on the slave's side, buses for converting from the clock on the master's side to the clock on the slave's side and a bus for converting from the clock on the slave's side to the clock on the master's side.

6 Claims, 25 Drawing Sheets

FIG. 4    ASYNCHRONOUS PROTOCOL BRIDGE (MASTER: HIGH SPEED, SLAVE: LOW SPEED)

FIG. 10 ASYNCHRONOUS PROTOCOL CONVERSION BRIDGE (MASTER: LOW SPEED, SLAVE: HIGH SPEED)

ASYNCHRONOUS PROTOCOL CONVERSION BRIDGE (MASTER: LOW SPEED, SLAVE: HIGH SPEED)

FIG. 21 ASYNCHRONOUS PROTOCOL CONVERSION BRIDGE (MASTER: LOW SPEED, SLAVE: HIGH SPEED)

ASYNCHRONOUS PROTOCOL CONVERSION BRIDGE
(CONVENTIONAL TYPE : MASTER: HIGH SPEED, SLAVE: LOW SPEED)

ASYNCHRONOUS PROTOCOL CONVERSION BRIDGE
(CONVENTIONAL TYPE: MASTER: HIGH SPEED, SLAVE: LOW SPEED)

INFORMATION PROCESSING UNIT

BACKGROUND OF THE INVENTION

1. Field of the Invention

The present invention relates to an information processing unit provided with an asynchronous protocol conversion function.

2. Description of the Related Art

An information processing unit provided with a conventional type asynchronous protocol conversion function realized data sending/receiving by handshaking for a request to send data and data acceptance authentication when the data was sent/received. Therefore, many processing cycles occurred in handshaking and as a result, data transmission efficiency was deteriorated. Conventional type information processing will be described below. FIG. 22 is a block diagram showing the configuration of the conventional type information processing unit and a data transmission situation and FIGS. 23, 24 and 25 show their waveforms.

As shown in FIG. 22, the conventional type information processing unit includes registers (flip-flops) 1a to 1e controlled by a clock on the side of a master (a transmission source), registers 2a to 2e controlled by a clock on the side of a slave (a transmission destination), logics 3 to 6 for protocol conversion and circuit control, a bus 7 for transmitting a data transmission signal, a bus 8 for transmitting a data transmission completion signal and a bus 9 for transmitting a data signal.

The data transmission signal is a control signal sent from the master's side to the slave's side prior to transmitting a data signal from the master's side to the slave's side according to a handshaking protocol for requesting circuit assurance. The data transmission completion signal is a post signal sent from the slave's side to the master's side to authorize the transmission of the next data signal in case the transmission of the data signal is completed.

In an asynchronous protocol conversion bridge shown in FIG. 22, a clock system on the master's side and a clock system on the slave's side are different and a clock boundary exists between the master's side and the slave's side. In such a case, on a clock boundary of the bus 7 on which the data transmission signal is transmitted, one register 1b and two cascaded registers 2a are arranged in pairs in a direction of transmission, on a clock boundary of the bus 8 on which the data transmission completion signal is transmitted, one register 2c and two cascaded registers 1d are arranged in pairs in the direction of transmission, and further, on a clock boundary of the bus 9 on which the data signal is transmitted, one register 1e and two cascaded registers 2e are arranged in pairs in the direction of transmission.

The reason why each register 1b, 2c, 1e is arranged before each clock boundary is to absorb the delay of each signal caused by the protocol conversion and the reason why each two cascaded registers 2a, 1d, 2e are arranged after each clock boundary is to absorb an unstable edge caused by the clock conversion.

The operation of the information processing unit configured as described above will be described below. The registers 1a to 1e on the master's side are operated according to a clock on the master's side and respective signals are delayed by one clock cycle on the master's side when they pass the registers 1a to 1e on the master's side. Similarly, the registers 2a to 2e on the slave's side are operated according to a clock on the slave's side and respective signals are delayed by one clock cycle on the slave's side when they pass the registers 2a to 2e on the slave's side.

Therefore, as shown by the waveforms in FIGS. 23, 24 and 25, in case the data transmission signal and the data signal are sent from a transmission source bus, it takes two master cycles until the data transmission signal reaches the clock boundary and it takes three slave cycles until the data transmission signal reaches the transmission destination bus from the clock boundary.

After so as to transmit the completion of data transmission to the transmission source bus, it takes two slave cycles until the data transmission completion signal reaches the clock boundary from the transmission destination bus and it takes three master cycles until the data transmission completion signal reaches the transmission source bus from the clock boundary, control is passed to the next data transmission. Incidentally, it takes one master cycle until the data signal reaches the clock boundary from the transmission source bus and it takes two slave cycles until the data signal reaches the transmission destination bus from the clock boundary.

Therefore, the number of cycles required until one data is transmitted and a command for the next data is issued is "5 master cycles+5 slave cycles". Asynchronous data transmission/reception is performed by repeating the above-mentioned processing.

In the meantime, there is also an example in which data transmission between different CPU system buses and between different PCI bus architectures is optimized and the efficiency is enhanced (refer to JP-A-348647 (FIG. 1)).

However, in the above-mentioned conventional type asynchronous protocol conversion circuit, to correspond to a case that the master is quick and the slave is slow, a case that the master is slow and the slave is quick and a case that the master is quick and the slave is quick, a protocol conversion logic is required to be arranged both on the master's side and on the slave's side, therefore multiple registers are required, the number of clock cycles required for sending/receiving the data transmission signal is increased, and as a result, data transmission efficiency is deteriorated.

Besides in related art, correspondence to a case that no data signal is transmitted soon after negotiation (circuit assurance) by the data transmission signal from the master's side is required, therefore the number of protocol conversion logics is increased, their speedup becomes difficult, and as a result, the data transmission efficiency is deteriorated.

In the meantime, the technique described in the patent document 1 is limited to data transmission between different CPU system buses on a motherboard and others and between different PCI bus architectures and it is difficult to apply the technique to an on-chip bus in an integrated circuit as it is.

SUMMARY OF THE INVENTION

The object of the invention is to provide an information processing unit that enables the enhancement of data transmission efficiency by considering a clock frequency, a data transmission method and a data storage method.

The information processing unit according to the invention is an information processing unit in which in case a data signal is asynchronously transmitted from a transmission source to a transmission destination different in a protocol, a data transmission signal is transmitted from the transmission source to the transmission destination beforehand and after the transmission of the data signal is completed, a data transmission completion signal is transmitted from the transmission destination to the transmission source. The information processing unit is provided with a transmission source functional block controlled by a clock of the transmission source for converting the data transmission signal issued by the transmission source to a protocol of the transmission destination, a first transmission source register which is controlled by the clock of the transmission source and to which the data transmission signal output from the transmission source functional block is input, an input signal bus provided on a boundary between the clock of the transmission source and the clock of the transmission destination for converting the data transmission signal from the clock of the transmission source to the clock of the transmission destination, a first transmission destination register which is controlled by the clock of the transmission destination and to which the data transmission signal that passes the input signal bus is input, a second transmission destination register which is controlled by the clock of the transmission destination and to which the data transmission completion signal issued by the transmission destination is input, a transmission destination functional block controlled by the clock of the transmission destination for converting the data transmission completion signal output from the second transmission destination register to the protocol of the transmission source, a third transmission destination register which is controlled by the clock of the transmission destination and to which the data transmission completion signal output from the transmission destination functional block is input, an output signal bus provided on the boundary between the clock of the transmission destination and the clock of the transmission source for converting the data transmission completion signal from the clock of the transmission destination to the clock of the transmission source, a second transmission source register which is controlled by the clock of the transmission source and to which the data transmission completion signal that passes the output signal bus is input, a third transmission source register which is controlled by the clock of the transmission source and to which the data signal issued by the transmission source is input, an input data bus provided on the boundary between the clock of the transmission source and the clock of the transmission destination for converting the data signal from the clock of the transmission source to the clock of the transmission destination and a fourth transmission destination register which is controlled by the clock of the transmission destination and to which the data signal that passes the input data bus is input.

According to the above-mentioned configuration, in case the clock of the transmission source information processing unit is slow and the clock of the transmission destination information processing unit is quick, the number of cycles required for the control of the information processing units can be reduced by arranging the protocol conversion logics of the data transmission signal and the data transmission completion signal in a section of the low-speed clock and in a section of the high-speed clock.

The information processing unit according to the invention is an information processing unit in which in case a data signal is asynchronously transmitted from a transmission source to a transmission destination different in a protocol, a data transmission signal is transmitted from the transmission source to the transmission destination beforehand and after the completion of the transmission of the data signal, a data transmission completion signal is transmitted from the transmission destination to the transmission source. The information processing unit is provided with a first transmission source register which is controlled by a clock of the transmission source and to which the data transmission signal issued by the transmission source is input, a first transmission source functional block controlled by the clock of the transmission source for converting the data transmission signal output from the first transmission source register to a protocol of the transmission destination, a second transmission source register which is controlled by the clock of the transmission source and to which the data transmission signal output from the first transmission source functional block is input, an input signal bus provided on a boundary between the clock of the transmission source and a clock of the transmission destination for converting the data transmission signal from the clock of the transmission source to the clock of the transmission destination, a first transmission destination register which is controlled by the clock of the transmission destination and to which the data transmission signal that passes the input signal bus is input, a second transmission destination register which is controlled by the clock of the transmission destination and to which the data transmission completion signal issued by the transmission destination is input, an output signal bus provided on the boundary between the clock of the transmission destination and the clock of the transmission source for converting the data transmission completion signal from the clock of the transmission destination to the clock of the transmission source, a third transmission source register which is controlled by the clock of the transmission source and to which the data transmission completion signal that passes the output signal bus is input, a second transmission source functional block controlled by the clock of the transmission source for converting the data transmission completion signal output from the third transmission source register to a protocol of the transmission source, a fourth transmission source register which is controlled by the clock of the transmission source and to which the data transmission completion signal output from the second transmission source functional block is input, a fifth transmission source register which is controlled by the clock of the transmission source and to which the data signal issued by the transmission source is input, an input data bus provided on the boundary between the clock of the transmission source and the clock of the transmission destination for converting the data signal from the clock of the transmission source to the clock of the transmission destination and a third transmission destination register which is controlled by the clock of the transmission destination and to which the data signal that passes the input data bus is input.

According to the above-mentioned configuration, in case the clock of the transmission source information processing unit is quick and the clock of the transmission destination information processing unit is slow, the number of cycles required for the control of the information processing unit can be reduced by concentrating protocol conversion logics for the data transmission signal and the data transmission completion signal in a section of the high-speed clock.

The information processing unit according to the invention is an information processing unit in which in case a data signal is asynchronously transmitted from a transmission source to a transmission destination different in a protocol, a data transmission signal is transmitted from the transmission source to the transmission destination beforehand and after the completion of the transmission of the data signal, a data transmission completion signal is transmitted from the transmission destination to the transmission source. The information processing unit is provided with a first transmission source register which is controlled by a clock of the transmission source and to which the data transmission signal issued by the transmission source is input, a transmission source preparation functional block controlled by the clock of the transmission source for partly converting the data transmission signal output from the first transmission source register to a protocol of the transmission destination, a second transmission source register which is controlled by the clock of the transmission source and to which the data transmission signal output from the transmission source preparation functional block is input, an input signal bus provided on a boundary between the clock of the transmission source and a clock of the transmission destination for converting the data transmission signal from the clock of the transmission source to the clock of the transmission destination, a first transmission destination register which is controlled by the clock of the transmission destination and to which the data transmission signal that passes the input signal bus and that is partly converted is input, a transmission destination subsequent process functional block controlled by the clock of the transmission destination for converting the data transmission signal output from the first transmission destination register and partly converted to the protocol of the transmission destination, a second transmission destination register which is controlled by the clock of the transmission destination and to which the data transmission signal output from the transmission destination subsequent process functional block is input, a third transmission destination register which is controlled by the clock of the transmission destination and to which the data transmission completion signal issued by the transmission destination is input, a transmission destination preparation functional block controlled by the clock of the transmission destination for partly converting the data transmission completion signal output from the third transmission destination register to the protocol of the transmission source, a fourth transmission destination register which is controlled by the clock of the transmission destination and to which the data transmission completion signal output from the transmission destination preparation functional block is input, an output signal bus provided on the boundary between the clock of the transmission destination and the clock of the transmission source for converting the data transmission completion signal from the clock of the transmission destination to the clock of the transmission source, a third transmission source register which is controlled by the clock of the transmission source and to which the data transmission completion signal that passes the output signal bus and that is partly converted is input, a transmission source subsequent process functional block controlled by the clock of the transmission source for converting the data transmission completion signal output from the third transmission source register and partly converted to the protocol of the transmission source, a fourth transmission source register which is controlled by the clock of the transmission source and to which the data transmission completion signal output from the transmission source subsequent process functional block is input, a fifth transmission source register which is controlled by the clock of the transmission source and to which the data signal issued by the transmission source is input, an input data bus provided on the boundary between the clock of the transmission source and the clock of the transmission destination for converting the data signal from the clock of the transmission source to the clock of the transmission destination and a fifth transmission destination register which is controlled by the clock of the transmission destination and to which the data signal that passes the input data bus is input.

According to the above-mentioned configuration, in case the clock of the transmission source information processing unit is quick and the clock of the transmission destination information processing unit is quick, the number of logics in the clock boundary is reduced and high-speed protocol conversion is enabled by splitting the function of the protocol conversion logic for the data transmission signal and the data transmission completion signal into the side of the transmission source information processing unit and the side of the transmission destination information processing unit.

The information processing unit according to the invention depends upon a command phase and a data phase, and data transmission is performed by a transmission method utilized for a pipeline protocol. According to the configuration, in case there is dependence upon the command phase and the data phase, data transmission between different protocols is optimized by performing data transmission by the transmission method utilized for the pipeline protocol and data transmission efficiency can be enhanced.

Further, the information processing unit according to the invention is provided with a data alignment control logic which is controlled by a clock of a transmission source and to which a data signal issued by the transmission source is input and a buffer controlled by the clock of the transmission source and having size equal to the maximum data bus size of a transmission destination for holding the data signal supplied from the data alignment control logic. Further, the buffer continuously transfers the holding data signals to the transmission destination.

According to the above-mentioned configuration, data transmission is enabled by a few signal control cycles and data transmission efficiency can be enhanced by providing the data alignment control logic and the buffer in transmission destination data bus size to a bus for a data signal output from the transmission source information processing unit and holding data up to transmission destination maximum data size in the buffer.

Besides, the information processing unit according to the invention is provided with a transmission source multiplexer controlled by a clock of a transmission source for selecting a data signal issued by the transmission source every transmission, a buffer controlled by the clock of the transmission source and having size equal to the maximum burst size of the transmission source for holding a data signal output from the transmission source multiplexer, a transmission destination multiplexer controlled by a clock of a transmission destination for selecting the data signal output from the buffer every transmission and a transmission destination register which is controlled by the clock of the transmission destination and to which the data signal output from the transmission destination multiplexer is input.

According to the above-mentioned configuration, data transmission efficiency can be enhanced by providing the multiplexer that allocates data every continuous transmission and the buffer that can hold data transmitted continuously at the maximum to the bus for the data signal output from the transmission source information processing unit, holding the data transmitted continuously at the maximum by the transmission source in the buffer and collectively issuing data transmission completion signals after the transmission of all consecutive data are completed.

Besides, the information processing unit according to the invention is provided with a transmission source multiplexer controlled by a clock of a transmission source for selecting a data signal issued by the transmission source according to an allocated slave ID signal, a buffer controlled by the clock of the transmission source for holding a data signal output from the transmission source multiplexer, a first transmission destination multiplexer controlled by a clock of a transmission destination for selecting an output control signal of the transmission destination, a second transmission destination multiplexer controlled by the clock of the transmission destination for selecting the data signal output from the buffer according to the output control signal supplied from the first transmission destination multiplexer and a transmission destination register which is controlled by the clock of the transmission destination and to which the data signal output from the second transmission destination multiplexer is input.

According to the above-mentioned configuration, as the multiplexer for allocating transmission data every slave ID and the buffer for holding the transmission data are provided to a bus for a data signal output from a transmission source information processing unit and data is issued owing to the buffer without waiting for a transmission destination information processing unit the operating speed of which is slow, data transmission efficiency can be enhanced.

Besides, the information processing unit according to the invention is provided with a transmission source multiplexer controlled by a clock of a transmission source for selecting a data signal issued by the transmission source according to an allocated thread ID signal, a buffer controlled by the clock of the transmission source for holding the data signal output from the transmission source multiplexer, a control circuit controlled by a clock of a transmission destination for selecting an output control signal of the transmission destination based upon line boundary character check data transmitted from the transmission source, a transmission destination multiplexer controlled by the clock of the transmission destination for selecting the data signal output from the buffer according to the output control signal supplied from the control circuit and a transmission destination register which is controlled by the clock of the transmission destination and to which the data signal output from the transmission destination multiplexer is input.

According to the above-mentioned configuration, as the multiplexer for allocating the transmission data every thread ID and the buffer for holding the transmission data are provided to the bus for the data signal output from a transmission source information processing unit and a process having temporal constraint of the transmission source is efficiently allocated owing the buffer, the real time of the transmission source information processing unit can be assured.

Besides, an input data bus of the information processing unit according to the invention includes an independent transmission destination dedicated bus every plural transmission destinations, and the information processing unit according to the invention is provided with a transmission source multiplexer controlled by a clock of a transmission source for allocating a data signal issued by the transmission source according to each transmission destination dedicated bus, a buffer controlled by the clock of the transmission source for holding the data signal output from the transmission source multiplexer and a transmission destination register which is controlled by a clock of the transmission destination, which is provided to each transmission destination dedicated bus and to which each data signal output from the buffer is input.

According to the above-mentioned configuration, bus contention between transmission destinations is eliminated by providing the multiplexer for allocating the transmission data every transmission destination, the buffer for holding the transmission data and the independent transmission destination dedicated bus every transmission destination to the bus for the data signal output from a transmission source information processing unit and data transmission efficiency can be enhanced.

Besides, the data signal of the information processing unit according to the invention includes a write data signal and a read data signal, and the information processing unit according to the invention is provided with a first transmission source multiplexer controlled by a clock of a transmission source for allocating the write data signal according to a transmission destination, a transmission source buffer controlled by the clock of the transmission source for holding the write data signal output from the first transmission source multiplexer, a first transmission destination multiplexer controlled by a clock of the transmission destination for selecting the write data signal output from the transmission source buffer according to an ID signal of the transmission destination, a second transmission destination multiplexer controlled by the clock of the transmission destination for allocating the read data signal according to the transmission source, a transmission destination buffer controlled by the clock of the transmission destination for holding the read data signal output from the second transmission destination multiplexer, a second transmission source multiplexer controlled by the clock of the transmission source for selecting the read data signal output from the transmission destination buffer according to an ID signal of the transmission source and a transmission destination register which is controlled by the clock of the transmission source and to which the read data signal output from the second transmission source multiplexer is input.

According to the above-mentioned configuration, as the transmission source and the transmission destination can both transmit/receive data independent of a data issue sequence by providing the multiplexer for allocating the write data signal every buffer, the buffer for holding the write data signal, the multiplexer for allocating the read data signal every buffer and the buffer for holding the read data signal to the bus for the data signal output from a transmission source information processing unit, data transmission efficiency can be enhanced.

Besides, the data signal of the information processing unit according to the invention includes a write data signal and a read data signal, and the information processing unit according to the invention is provided with plural write data buses for transmitting the write data signal, plural read data buses for transmitting the read data signal, a first transmission source multiplexer controlled by a clock of a transmission source for allocating the write data signal according to a transmission destination, a write data buffer controlled by the clock of the transmission source for holding the write data signal output from the first transmission source multiplexer, a transmission destination register which is controlled by a clock of the transmission destination and to which the write data signal output from the write data buffer is input via the write data bus, a read data buffer controlled by the clock of the transmission destination for holding the read data signal output from the transmission destination, a second transmission source multiplexer controlled by the clock of the transmission source for selecting the read data signal supplied to the read data buffer via the read data bus according to the transmission source and a transmission source register which is controlled by the clock of the transmission source and to which the read data signal output from the second transmission source multiplexer is input.

According to the above-mentioned configuration, plural transmission sources and plural transmission destinations can share the buffer by providing the multiplexer for allocating the write data signal every buffer, the buffer for holding the write data signal, the multiplexer for allocating the read data signal every buffer, the buffer for holding the read data signal, the dedicated bus independent every plural transmission sources and the dedicated bus independent every transmission destination to the bus for the data signal output from plural transmission source information processing units, bus contention between the transmission source and the transmission destination is eliminated, and data transmission efficiency can be enhanced.

According to the invention, signal control cycles are reduced by arranging the protocol conversion logic according to clock frequencies of the transmission source (the master) and the transmission destination (the slave) and providing the transmission destination maximum data bus size buffer and the transmission source maximum continuous transmission buffer, and data transmission efficiency can be enhanced.

DETAILED DESCRIPTION OF THE PREFERRED EMBODIMENTS

First Embodiment

Figure 1:
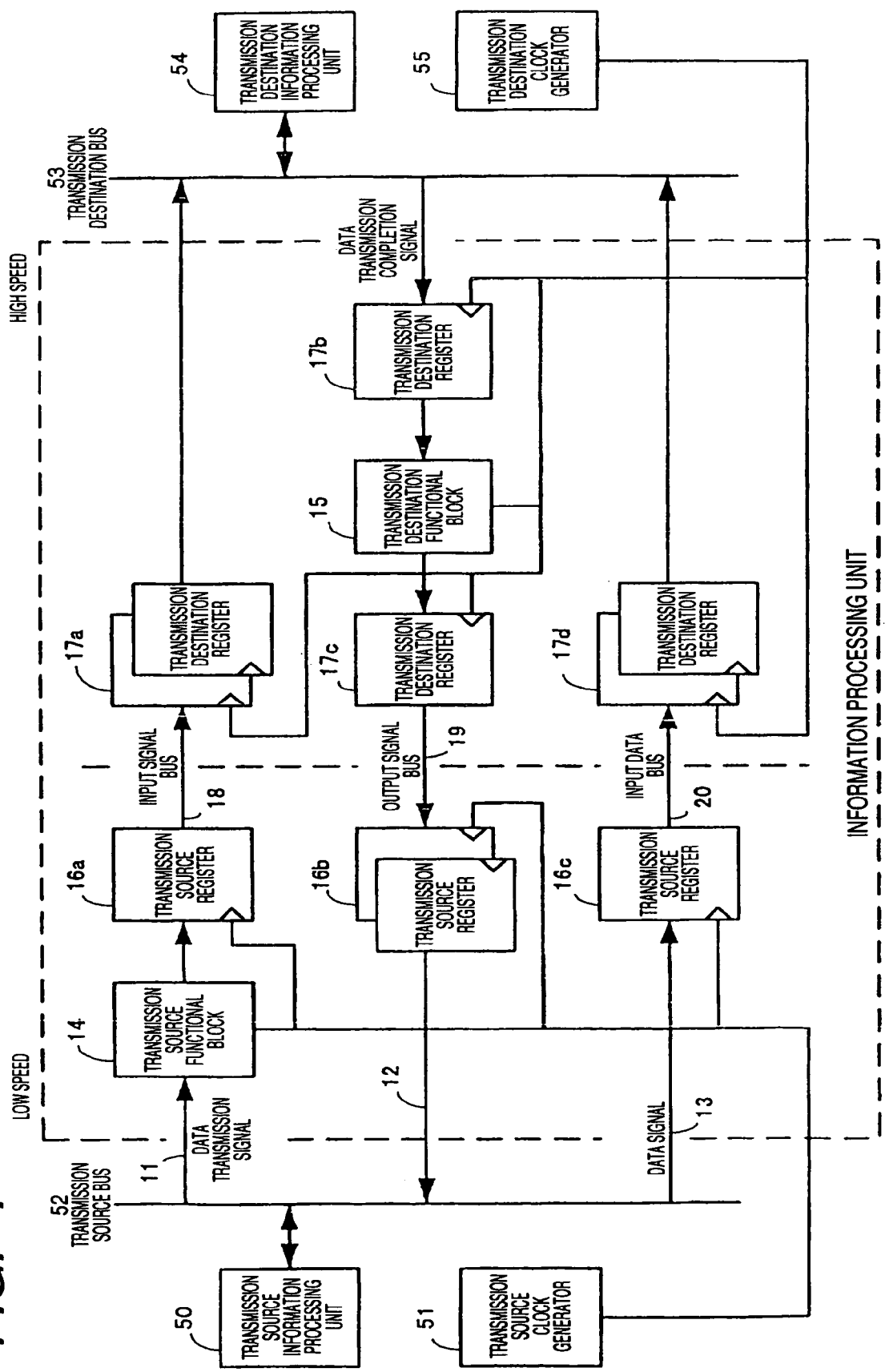
FIG. 1 is a block diagram showing the schematic configuration of an information processing unit in a first embodiment of the invention.
Figure 2:
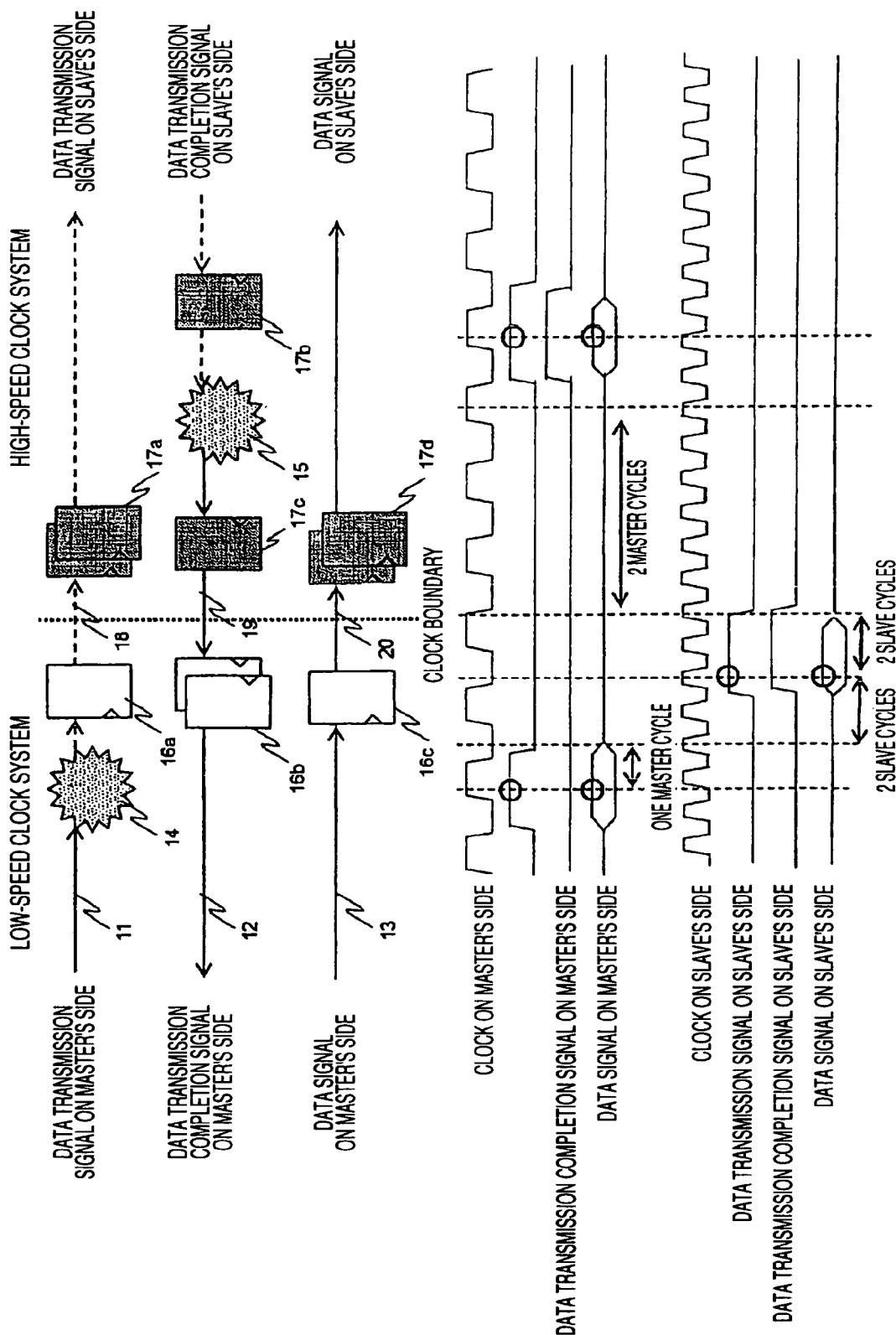
FIG. 2 is a time chart of the information processing unit in the first embodiment of the invention.

FIG. 1 is a block diagram showing the schematic configuration of an information processing unit for explaining a first embodiment of the invention and FIG. 2 is a time chart for explaining the operation. The information processing unit equivalent to the first embodiment is configured on the premise that a clock on the master's side is slower than a clock on the slave's side.

The information processing unit equivalent to this embodiment is provided with a bus 11 on which a data transmission signal is transmitted from the side of a master (a transmission source) to the side of a slave (a transmission destination), a bus 12 on which a data transmission completion signal is transmitted from the slave's side to the master's side, a bus 13 on which a data signal is transmitted from the master's side to the slave's side, a functional block 14 for converting a protocol on the master's side to a protocol on the slave's side, a functional block 15 for converting the protocol on the slave's side to the protocol on the master's side, registers 16a, 16b, 16c controlled by a clock on the master's side, registers 17a, 17b, 17c, 17d controlled by a clock on the slave's side, buses 18, 20 for conversion from the clock on the master's side to the clock on the slave's side and a bus 19 for conversion from the clock on the slave's side to the clock on the master's side.

In the information processing unit equivalent to this embodiment, on a path on which the data transmission signal is transmitted from the master's side to the slave's side, the transmission source functional block 14 for protocol conversion is provided only on the low-speed master's side. This reason is that protocol conversion on the side of a low-speed clock has a more margin and related processing which was formerly performed on the high-speed side can be performed together.

Registers (flip-flops) are required as a rule before and after protocol conversion, however, as the side of the low-speed clock has a margin in timing, the registers in the front can be omitted. Hereby, the number of cycles on the low-speed side which has a great effect on transmission efficiency can be reduced.

In the meantime, on a path on which the data transmission completion signal is transmitted, registers are required either on the master's side or on the slave's side, however, as the arrangement on the high-speed side has shorter occupational transfer time (one cycle), the whole transfer time is reduced by arranging on the high-speed side, and besides, as two registers exist on the high-speed side, a protocol conversion logic is provided on the high-speed side utilizing the arrangement and transmission efficiency is enhanced by omitting a protocol conversion logic on the low-speed side.

The operation of the information processing unit equivalent to this embodiment configured as described above will be described below. In case data transmission is performed from the master's side to the slave's side, the data transmission signal and the data signal are simultaneously issued from the master's side, the data transmission signal is converted to a protocol on the slave's side by the functional block 14, it takes one mater cycle to a clock boundary, and it takes two slave cycles from the boundary to the slave's side.

When the slave accepts the data transmission signal, it starts data reception as soon as the slave gets ready for data reception. After data reception, the data transmission completion signal is converted to a protocol on the master's side by the functional block 15, it tales two slave cycles to the clock boundary, and it takes two master cycles from the clock boundary to the master's side.

As soon as the master receives the data transmission completion signal, it performs the next data transmission. As to the data signal, it takes one master cycle from the master's side to the clock boundary and it takes two slave cycles from the boundary to the slave's side.

Therefore, as shown by the waveforms in FIG. 2, as the number of cycles required until one data is transmitted and the next data is issued is "3 master cycles+4 slave cycles", transmission efficiency can be enhanced more than that in the conventional type method.

Second Embodiment

Figure 3:
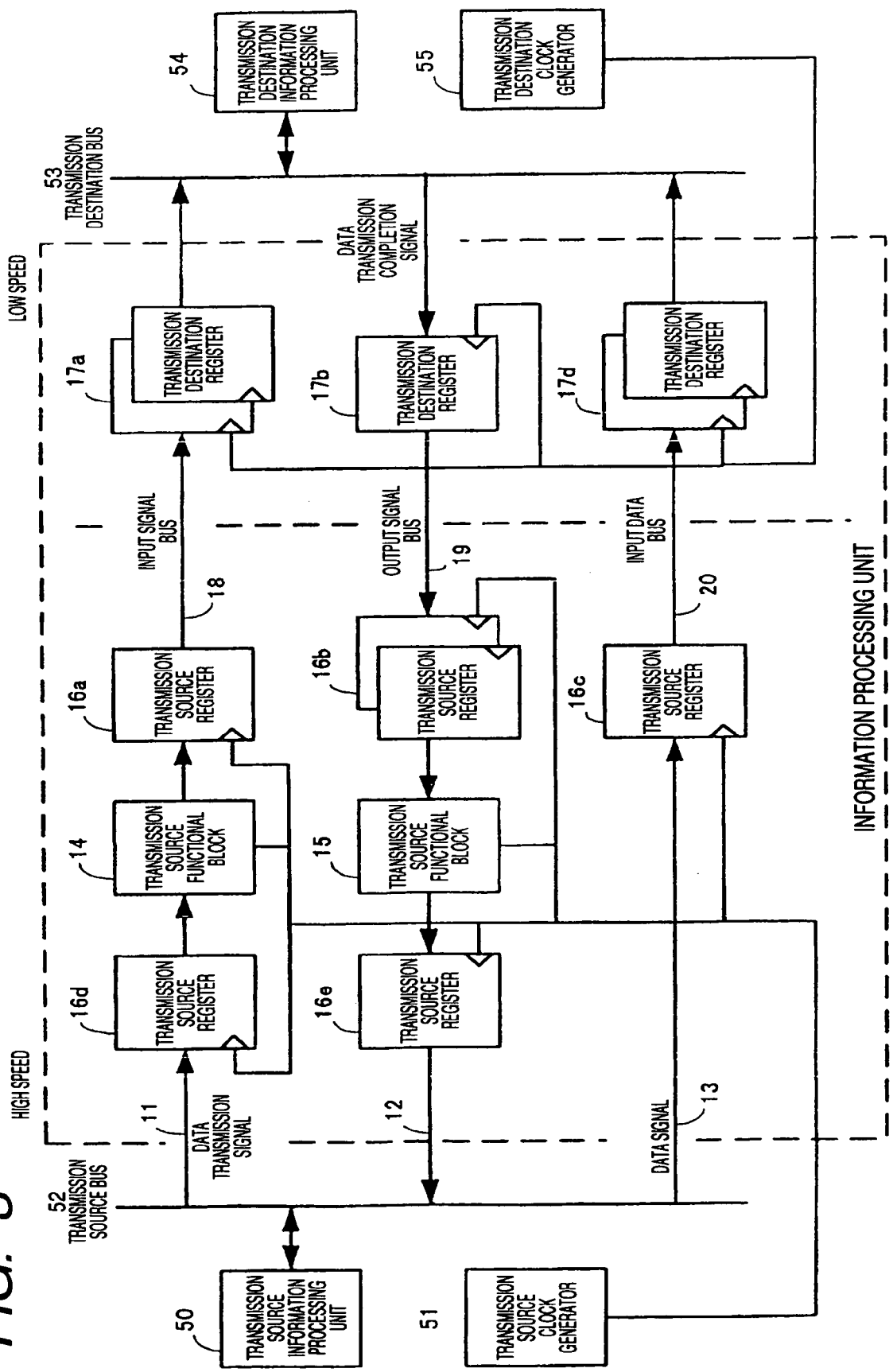
FIG. 3 is a block diagram showing the schematic configuration of an information processing unit in a second embodiment of the invention.
Figure 4:
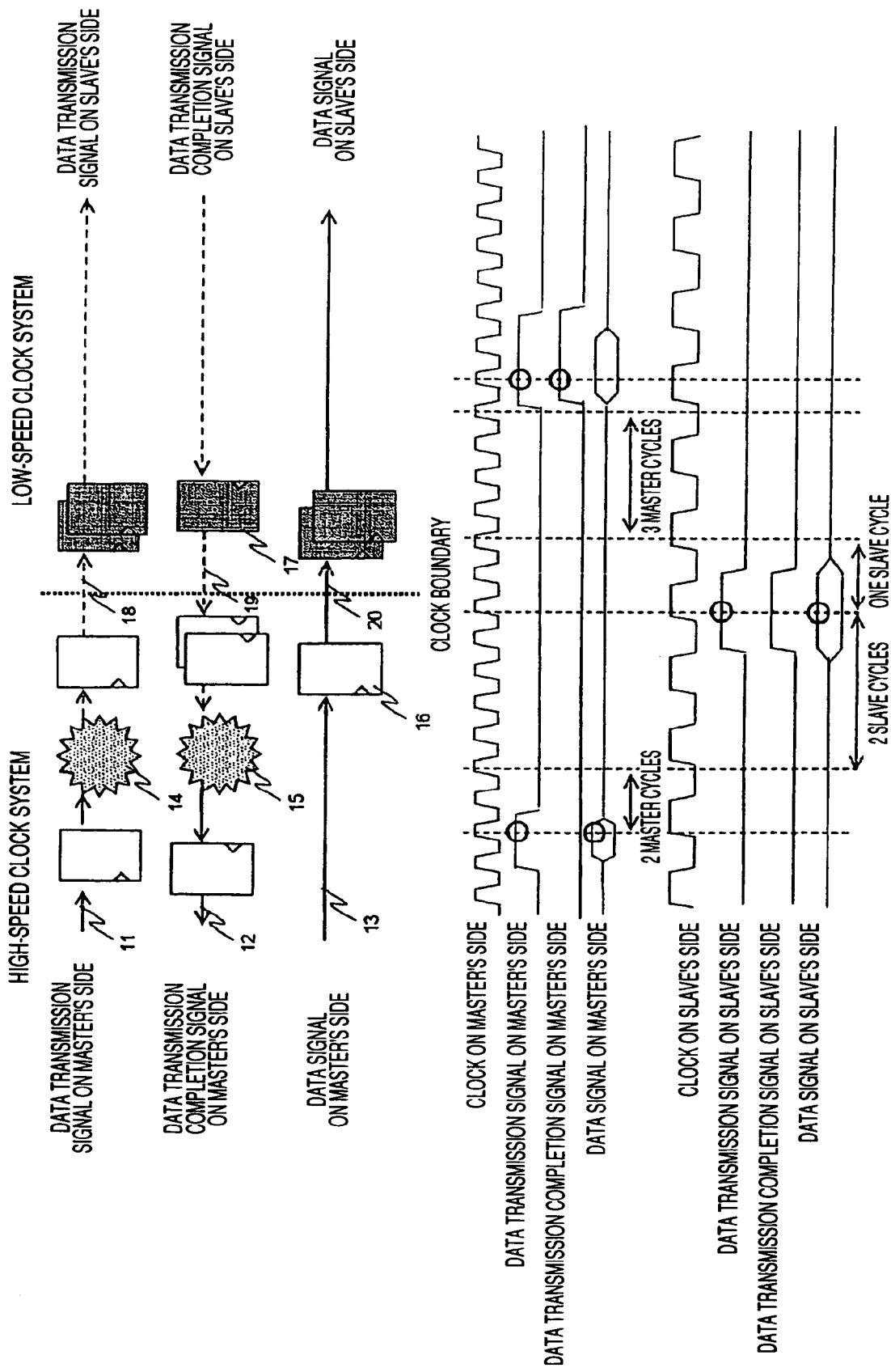
FIG. 4 is a time chart of the information processing unit in the second embodiment of the invention.

FIG. 3 is a block diagram showing the schematic configuration of an information processing unit for explaining a second embodiment of the invention and FIG. 4 is a time chart for explaining the operation. As the same reference number as that in the first embodiment denotes the same component in FIGS. 3 and 4, the detailed description is omitted. It is premised in the information processing unit equivalent to this embodiment that a clock on the master's side is quicker than a clock on the slave's side.

In this embodiment, a functional block 14 for converting the protocol on the high-speed side to the protocol on the low-speed side and a functional block 15 for converting the protocol on the low-speed side to the protocol on the high-speed side are both provided on the high-speed side and on the low-speed side, no protocol conversion block is provided. Hereby, registers on the low-speed side the time of one cycle of which is long can be omitted and the whole transfer time can be reduced.

The operation of the information processing unit configured as described above will be described below. In case data transmission is performed from the master's side to the slave's side, a data transmission signal and a data signal are simultaneously issued from the master's side, the data transmission signal is converted to the protocol on the slave's side by the functional block 14, it takes two master cycles to a clock boundary, and it takes two slave cycles from the boundary to the slave's side.

When the slave accepts the data transmission signal, it starts data reception as soon as the slave gets ready for data reception. After data reception, a data transmission completion signal is converted to the protocol on the master's side by the functional block 15, it takes one slave cycle to the clock boundary, and it takes three master cycles from the clock boundary to the master's side.

As soon as the master receives the data transmission completion signal, it performs the next data transmission. As to the data signal, it takes one master cycle from the master's side to the clock boundary and it takes two slave cycles from the boundary to the slave's side.

Therefore, as shown by waveforms in FIG. 4, as the number of cycles required until one data is transmitted and the next data is issued is "5 master cycles+3 slave cycles", transmission efficiency can be enhanced more than that in the conventional type method.

Third Embodiment

Figure 5:
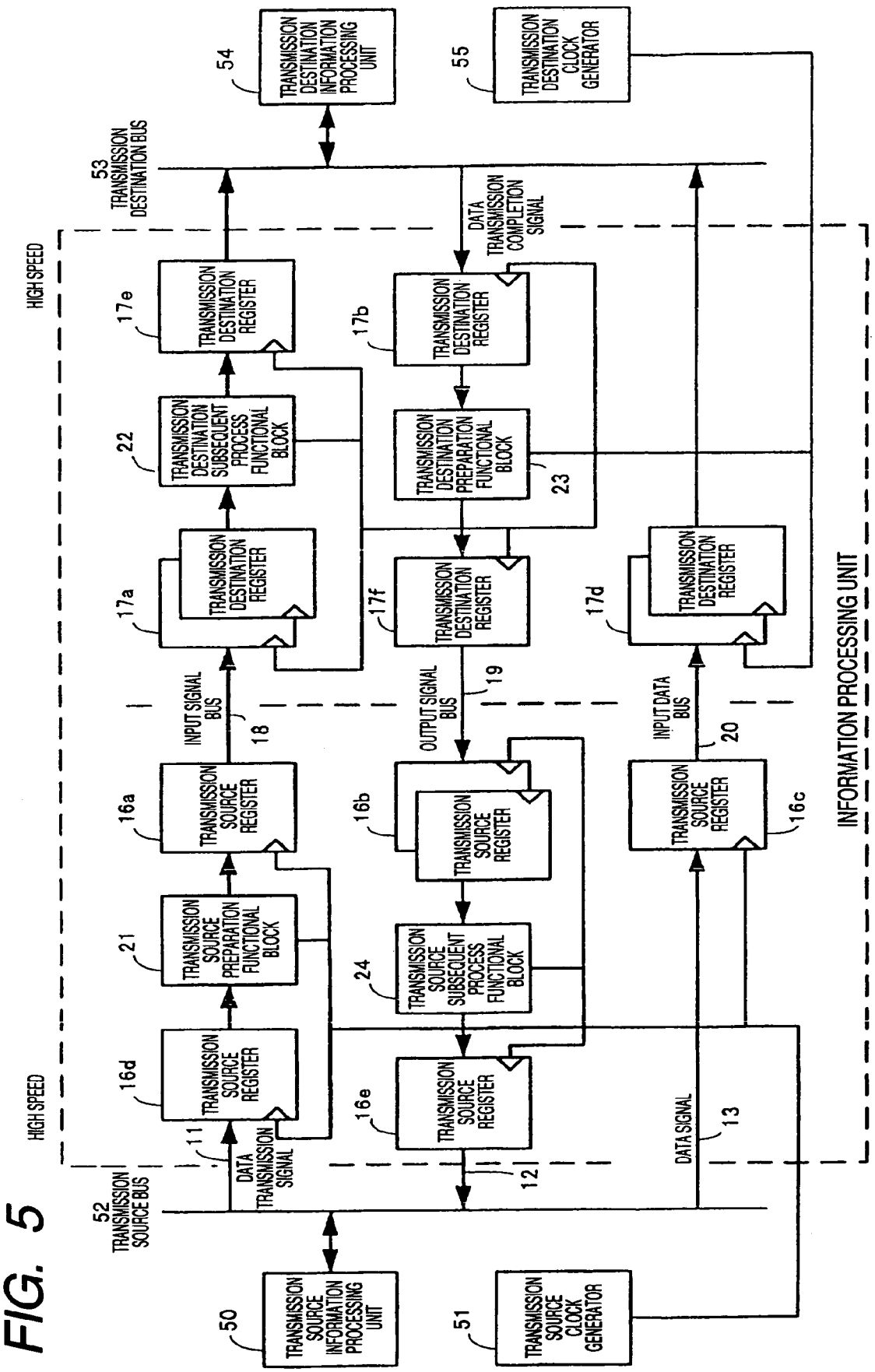
FIG. 5 is a block diagram showing the schematic configuration of an information processing unit in a third embodiment of the invention.
Figure 6:
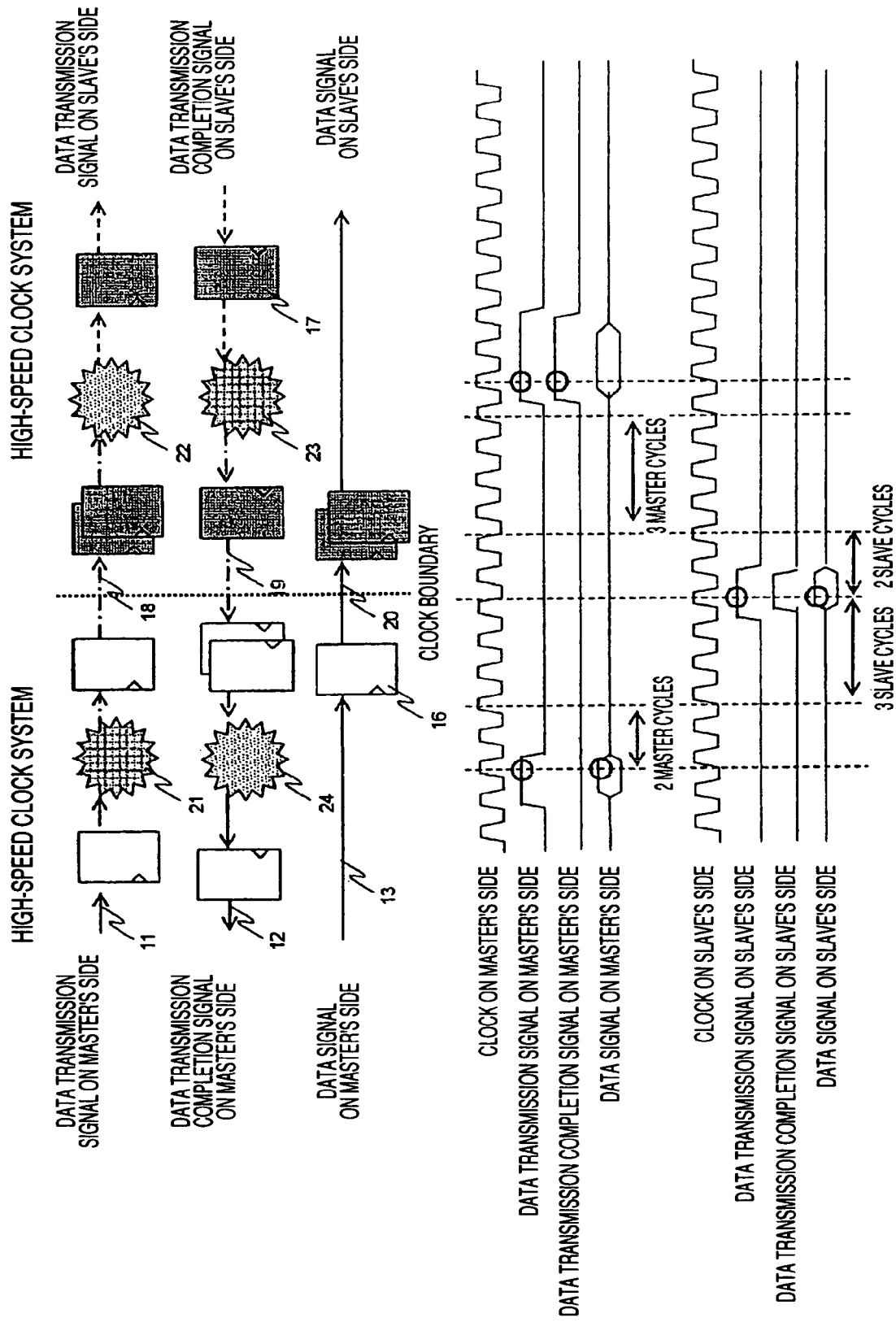
FIG. 6 is a time chart of the information processing unit in the third embodiment of the invention.

FIG. 5 is a block diagram showing the schematic configuration of an information processing unit for explaining a third embodiment of the invention and FIG. 6 is a time chart for explaining the operation. As the same reference number as that in the first embodiment denotes the same component in FIGS. 5 and 6, the detailed description is omitted.

It is premised in the information processing unit equivalent to this embodiment that both a clock on the master's side and a clock on the slave's side are quick. The information processing unit equivalent to this embodiment includes a transmission source preparation functional block 21 for partly converting a protocol on the master's side to a protocol on the slave's side, a transmission destination subsequent process functional block 22 for converting the partly converted protocol to the protocol on the slave's side, a transmission destination preparation functional block 23 for partly converting the protocol on the slave's side to the protocol on the master's side and a transmission source subsequent process functional block 24 for converting the partly converted protocol to the protocol on the master's side.

The operation of the information processing unit configured as described above will be described below. In case data transmission is performed from the master's side to the slave's side, a data transmission signal and a data signal are simultaneously issued from the master's side, the data transmission signal is partly converted to the protocol on the slave's side by the preparation functional block 21, and it takes two master cycles to a clock boundary. The partly converted protocol is converted to the protocol on the slave's side by the subsequent process functional block 22 and it takes three slave cycles from the boundary to the slave's side.

When the slave accepts the data transmission signal, it starts data reception as soon as the slave gets ready for data reception. After data reception, a data transmission completion signal is partly converted to the protocol on the master's side by the preparation functional block 23 and it takes two slave cycles to the clock boundary.

The partly converted protocol is converted to the protocol on the master's side by the subsequent process functional block 24 and it takes three master cycles from the clock boundary to the master's side.

As soon as the master receives the data transmission completion signal, it performs the next data transmission. As to the data signal, it takes one master cycle from the master's side to the clock boundary and it takes two slave cycles from the boundary to the slave's side.

Therefore, as shown by waveforms in FIG. 6, the number of cycles required until one data is transmitted and the next data is issued is "5 master cycles+5 slave cycles". As in this embodiment, a function heretofore allocated to one conversion logic is distributed to two conversion logics and the processing quantity of each conversion logic can be reduced, speedup is enabled. As protocol conversion is distributed to the transmission source and the transmission destination and is efficiently processed, the number of protocol conversion logics is reduced and protocol conversion can be sped up.

Fourth Embodiment

Figure 7:
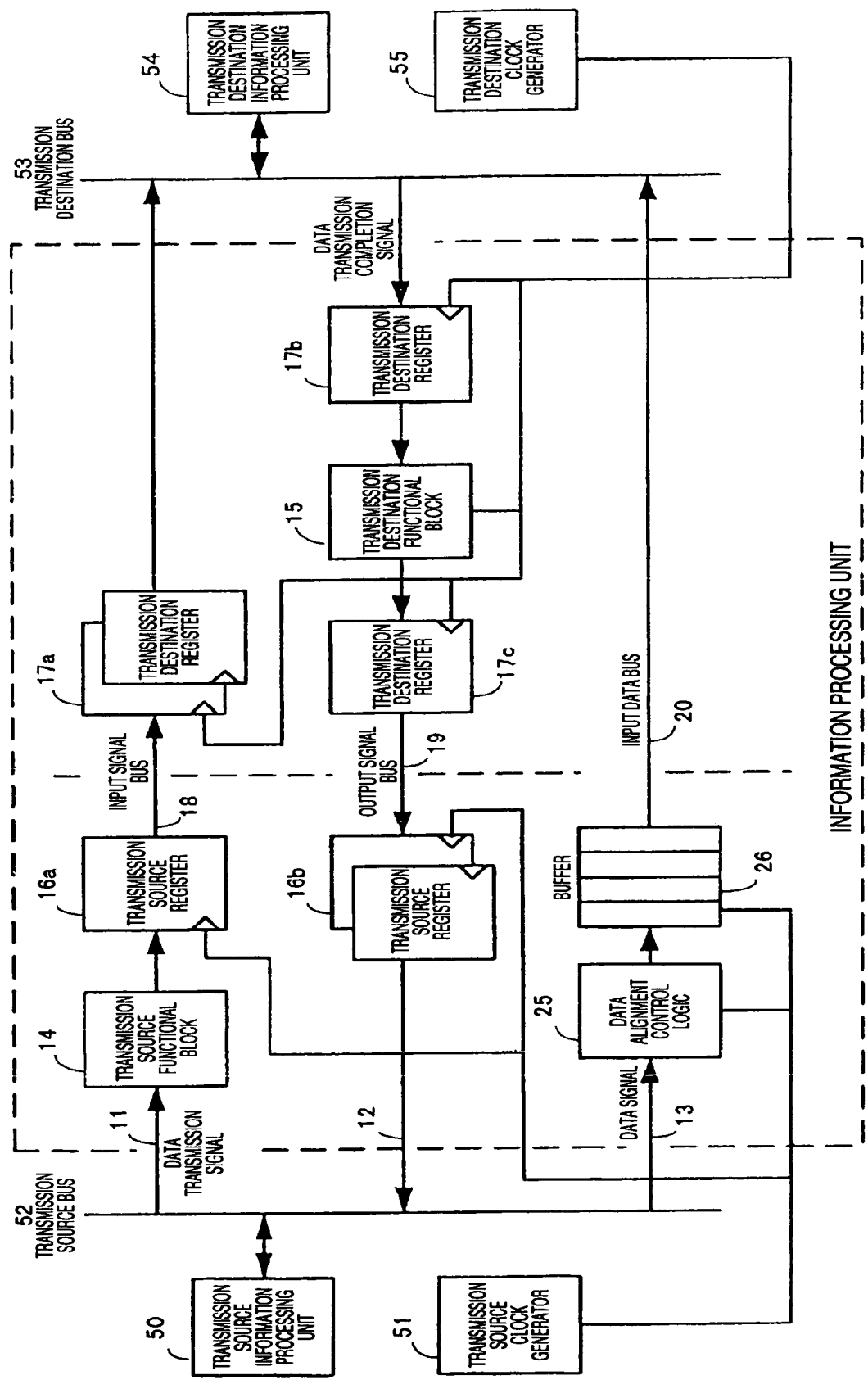
FIG. 7 is a block diagram showing the schematic configuration of an information processing unit in a fourth embodiment of the invention.
Figure 8:
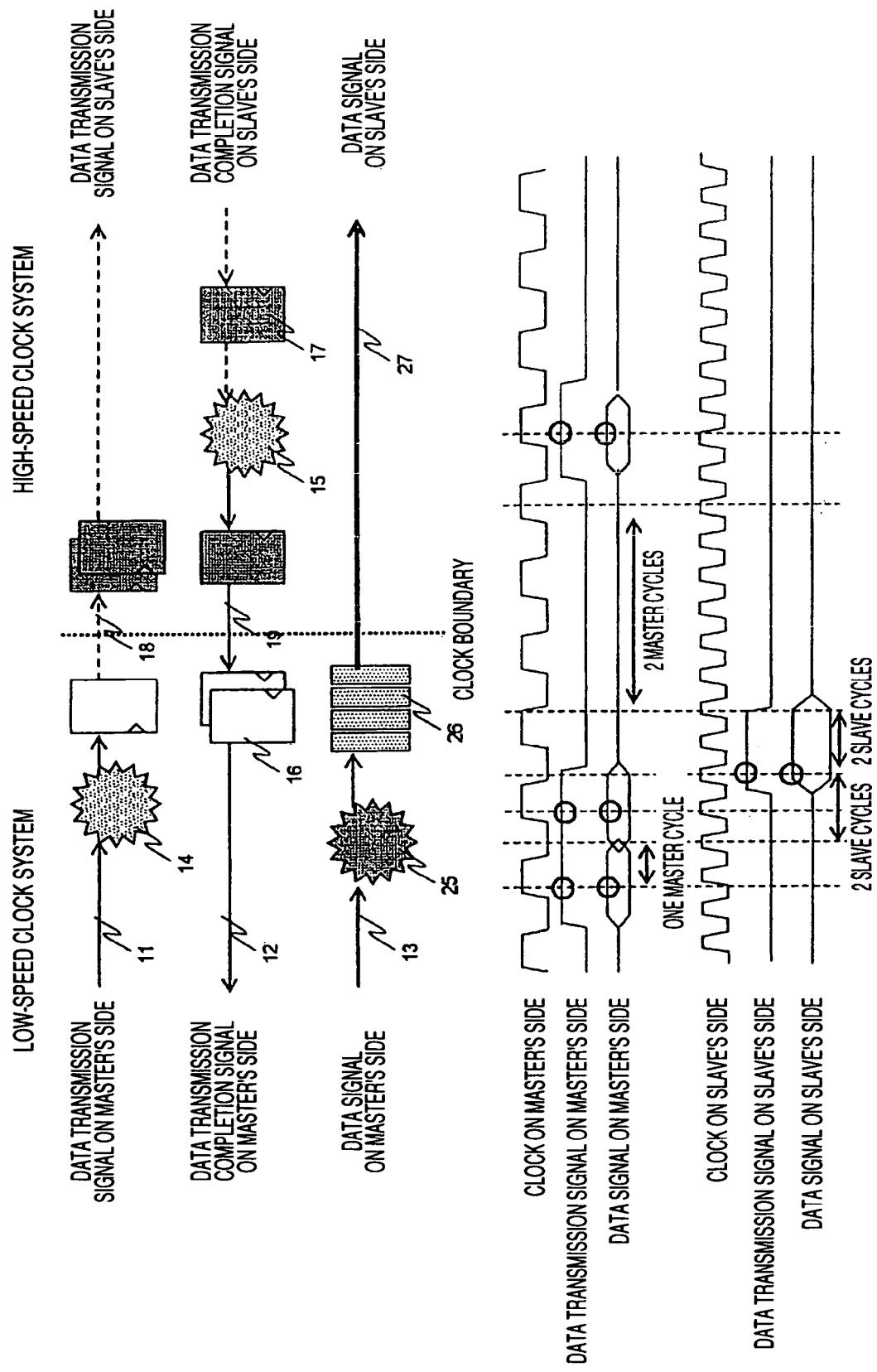
FIG. 8 is a time chart of the information processing unit in the fourth embodiment of the invention.

FIG. 7 is a block diagram showing the schematic configuration of an information processing unit for explaining a fourth embodiment of the invention and FIG. 8 is a time chart for explaining the operation. As the same reference number as that in the first embodiment denotes the same component in FIGS. 7 and 8, the detailed description is omitted.

The information processing unit equivalent to this embodiment transmits plural data signals in a burst mode in one circuit assurance and includes a data alignment control logic 25 for rearranging a data array and a buffer 26 in the size of a transmission destination data bus.

In this embodiment and other embodiments which will be described below, the case that a clock on the master's side is slower than a clock on the slave's side is adopted as an example as in the first embodiment, however, this embodiment can be also applied to a case that the clock on the master's side is quicker than the clock on the slave's side and a case that the clock on the master's side and the clock on the slave's clock are both quick.

The operation of the information processing unit equivalent to this embodiment will be described below. Data transmission from the master's side to the slave's side is performed continuously twice. A data transmission signal and a data signal are simultaneously issued from the master's side, the data transmission signal is converted to a protocol on the slave's side by a functional block 14, it takes one master cycle to a clock boundary, and it takes two slave cycles from the boundary to the slave's side.

When the slave accepts the data transmission signal, it starts data reception as soon as the slave gets ready for data reception. After data reception, a data transmission completion signal is converted to a protocol on the master's side by a functional block 15, it takes two slave cycles to the clock boundary, and it takes two master cycles from the boundary to the master's side. As soon as the master receives the data transmission completion signal, it performs the next data transmission.

As to the data signal, data transmission is performed continuously twice, the data signal is rearranged in one data array by a data alignment control logic 25 and is transmitted. It takes one master cycle from the master's side to the clock boundary and the data continue to be output from the boundary to the slave's side as it is. Therefore, as data width is extended up to transmission destination maximum data size by the buffer 26 and data transmission is enabled by a few signal control cycles, data transmission efficiency can be enhanced.

In this embodiment, the case that the clock on the master's side is slower than the clock on the slave's side is adopted as an example, however, this embodiment can be applied independent of a condition on clocks between the master and the slave. This embodiment can be also used together with fifth, sixth, seventh, eighth, ninth and tenth embodiments described below.

Fifth Embodiment

Figure 9:
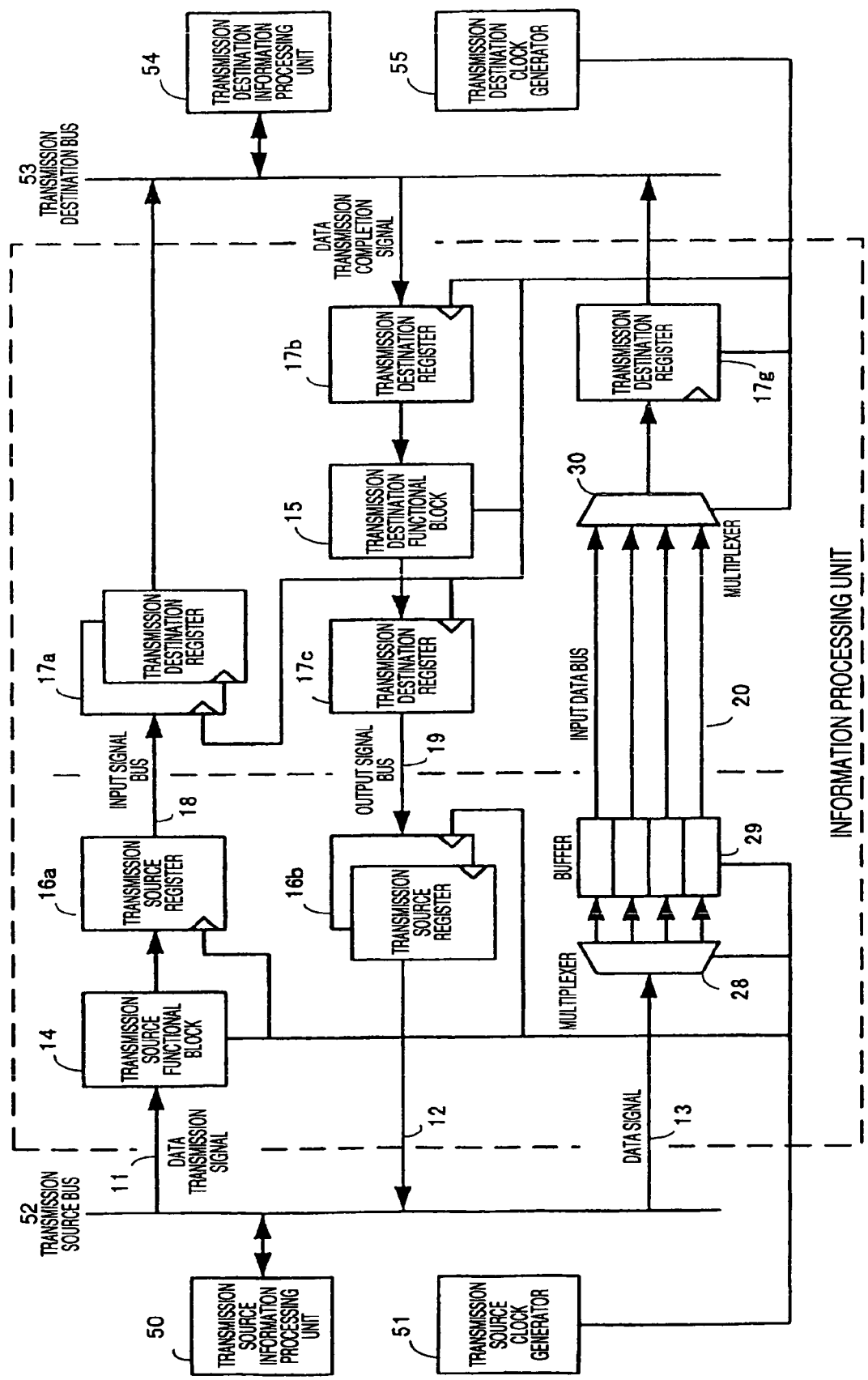
FIG. 9 is a block diagram showing the schematic configuration of an information processing unit in a fifth embodiment of the invention.
Figure 10:
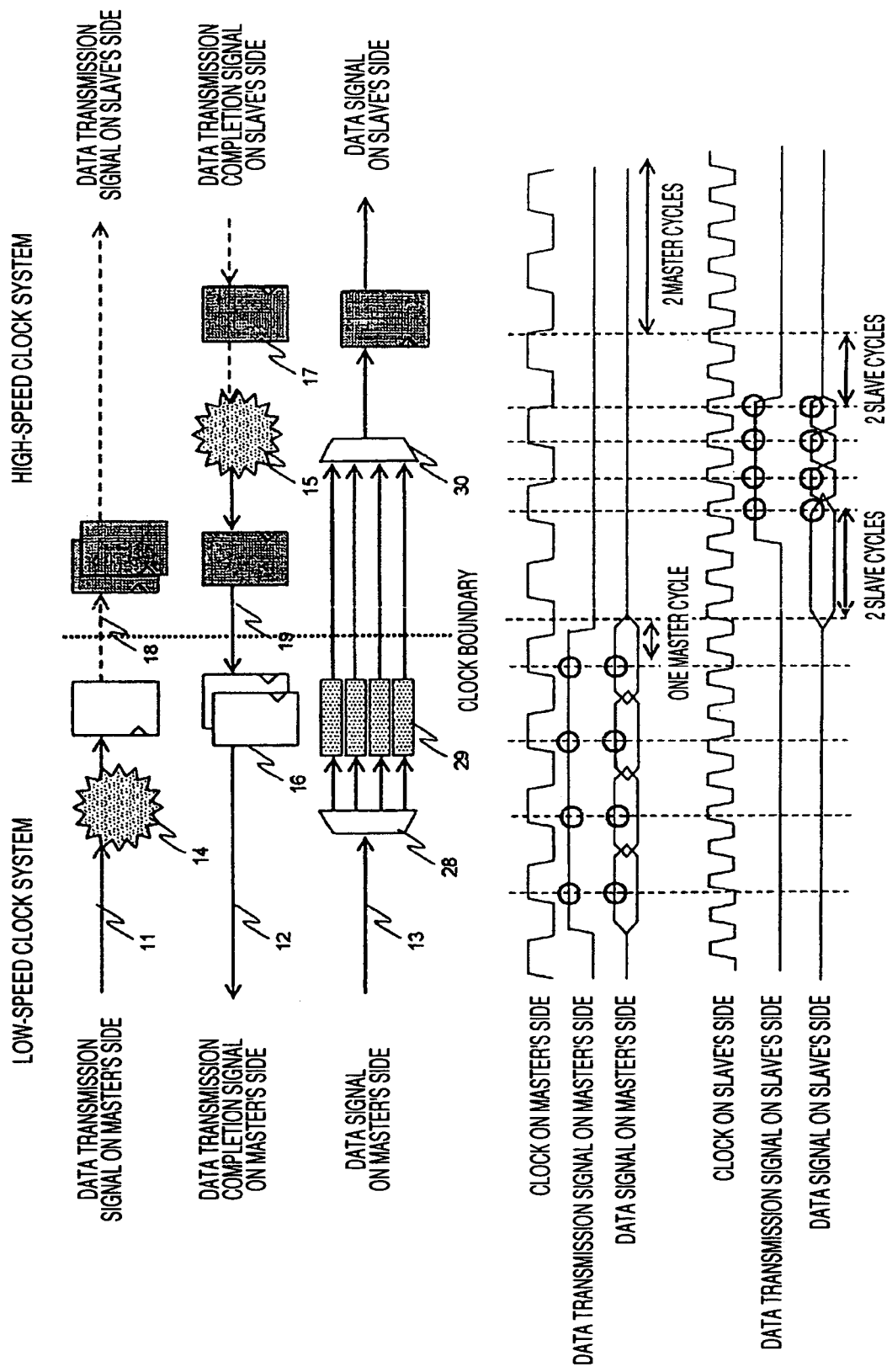
FIG. 10 is a time chart of the information processing unit in the fifth embodiment of the invention.

FIG. 9 is a block diagram showing the schematic configuration of an information processing unit for explaining a fifth embodiment of the invention and FIG. 10 is a time chart for explaining the operation. As the same reference number as that in the first embodiment denotes the same component in FIGS. 9 and 10, the detailed description is omitted.

As to the information processing unit equivalent to this embodiment, a multiplexer multiplexes data signals and the information processing unit equivalent to this embodiment includes a multiplexer 28 that allocates data every continuous transmission, a buffer 29 that can hold data transmitted continuously at the maximum and a multiplexer 30 that selects data from the buffer 29.

The operation of the information processing unit configured as described above will be described below. Data transmission is performed continuously four times from the master's side to the slave's side. A data transmission signal and a data signal are simultaneously issued from the master's side, the data transmission signal is converted to a protocol on the slave's side by a functional block 14, it takes one master cycle to a clock boundary, and it takes two slave cycles from the boundary to the slave's side.

When the slave accepts the data transmission signal, it starts data is reception as soon as the slave gets ready for data reception. After data reception, a data transmission completion signal is converted to a protocol on the master's side by a functional block 15, it takes two slave cycles to the clock boundary, and it takes two master cycles from the clock boundary to the master's side. As soon as the master receives the data transmission completion signal, it performs the next data transmission.

It takes one master cycle for the data signal to reach the clock boundary from the master's side, the multiplexer 28 stores all four consecutive data in each buffer 29 and continues to transmit all the four consecutive data to the slave's side. As soon as the slave gets ready for data reception, the multiplexer 30 selects in the order of data transmission any time and transmits data. It takes one slave cycle from the boundary to the slave's side. As described above, in this embodiment, data transmission efficiency can be enhanced by reducing the frequency of the issue of the data transmission completion signal every data.

In this embodiment, the case that the clock on the master's side is slower than the clock on the slave's side is adopted as an example however, this embodiment can be applied independent of a condition on the clocks between the master and the slave. This embodiment may be also used together with the fourth embodiment or a sixth, seventh, eighth, ninth or tenth embodiment.

Sixth Embodiment

Figure 11:
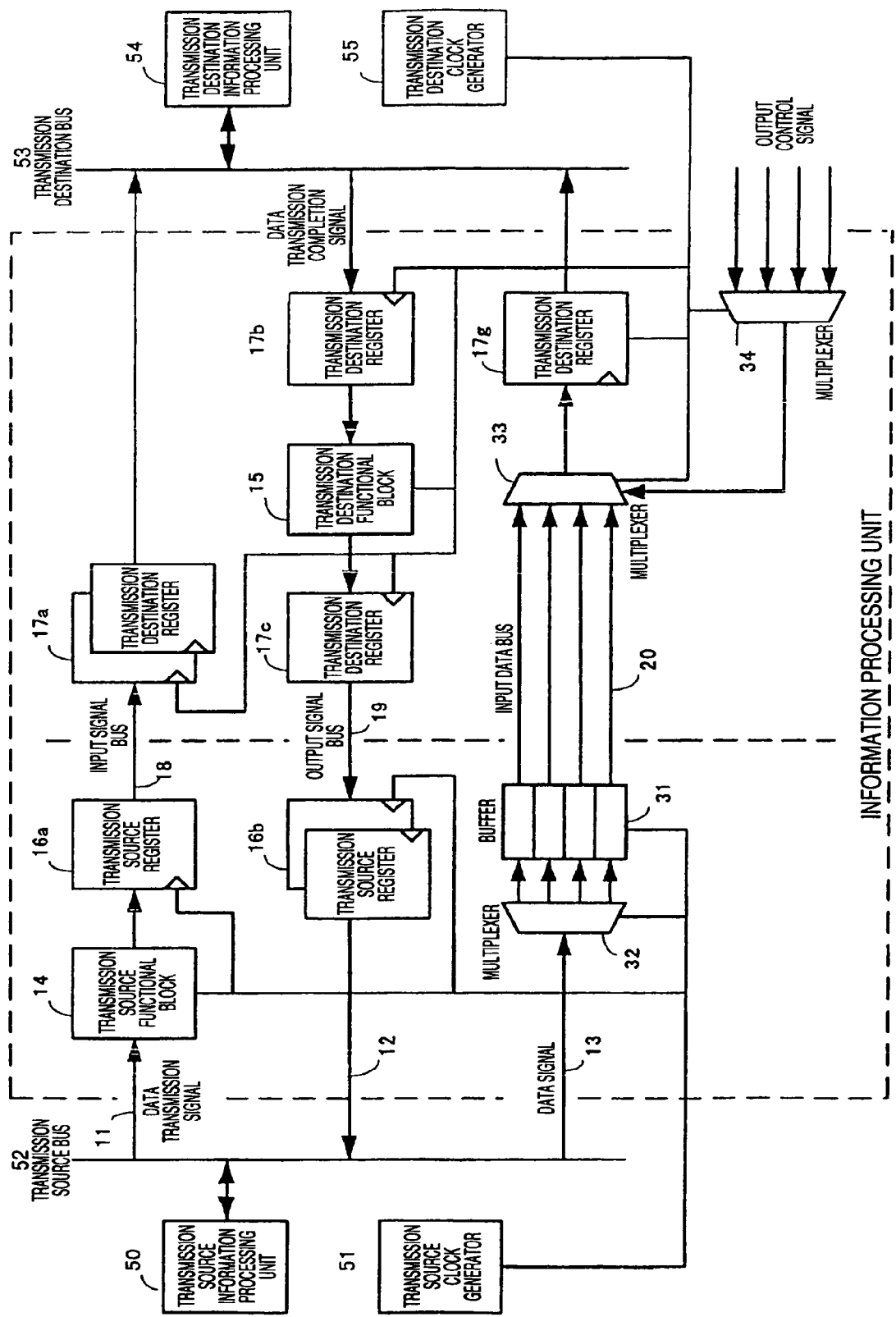
FIG. 11 is a block diagram showing the schematic configuration of an information processing unit in a sixth embodiment of the invention.
Figure 12:
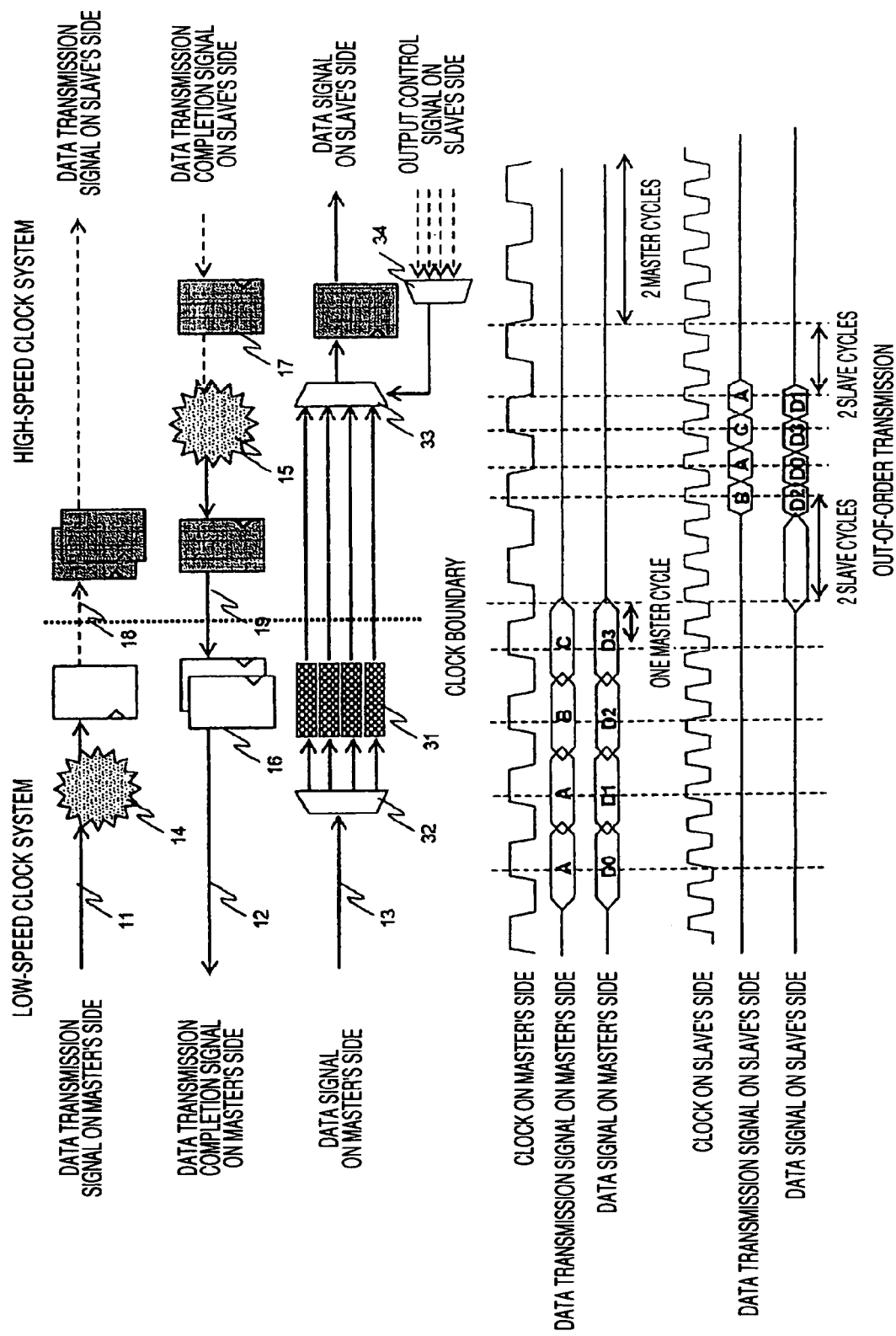
FIG. 12 is a time chart of the information processing unit in the sixth embodiment of the invention.

FIG. 11 is a block diagram showing the schematic configuration of an information processing unit for explaining a sixth embodiment of the invention and FIG. 12 is a time chart for explaining the operation. As the same reference number as that in the first embodiment denotes the same component in FIGS. 11 and 12, the detailed description is omitted.

The information processing unit equivalent to this embodiment can change the order of data according to a control signal supplied to a demultiplexer and includes a buffer 31 for holding transmission data allocated every slave ID, a multiplexer 32 for allocating the transmission data every slave ID, a multiplexer 33 for selecting the transmission data output from the buffer 31 according to a control signal from a multiplexer 34 and the multiplexer 34 for selecting data reception preparation completion notice from the slave and sending a control signal to the multiplexer 33.

The operation of the information processing unit configured as described above will be described below. The master transmits data to the slave continuously four times. A data transmission signal and a data signal are simultaneously issued by the master, the data transmission signal is converted to a protocol on the slave's side by a functional block 14, it takes one master cycle to a clock boundary, and it takes two slave cycles from the boundary to the slave's side.

When the slave accepts the data transmission signal, it starts data reception as soon as the slave gets ready for data reception. After data reception, a data transmission completion signal is converted to a protocol on the master's side by a functional block 15, it takes two slave cycles to the clock boundary, and it takes two master cycles from the clock boundary to the master's side. As soon as the master receives the data transmission completion signal, it performs the next data transmission.

As to a data signal, it takes one master cycle from the master's side to the clock boundary, the multiplexer 32 stores all four consecutive data in each buffer 31 every slave and continues to transmit all the four consecutive data to the slave's side. As soon as each slave gets ready for data reception, each slave transmits access permission notice to the multiplexer 34, the multiplexer 34 selects the access permission notice from each slave and inputs the selected access permission notice to the multiplexer 33.

The multiplexer 33 selects data to each slave any time and transmits the selected data. It takes one slave cycle from the boundary to the slave's side. According to this embodiment, as the frequency of the issue of the data transmission completion signal every data is reduced and the issue of data is enabled without waiting for a slave's process which is slow in operating speed, data transmission efficiency can be enhanced.

In this embodiment, the case that a clock on the master's side is slower than a clock on the slave's side is adopted as an example, however, this embodiment can be applied independent of a condition on the clocks between the master and the slave. This embodiment may be also used together with the fourth or fifth embodiment or the seventh, eighth, ninth or tenth embodiment.

Seventh Embodiment

Figure 13:
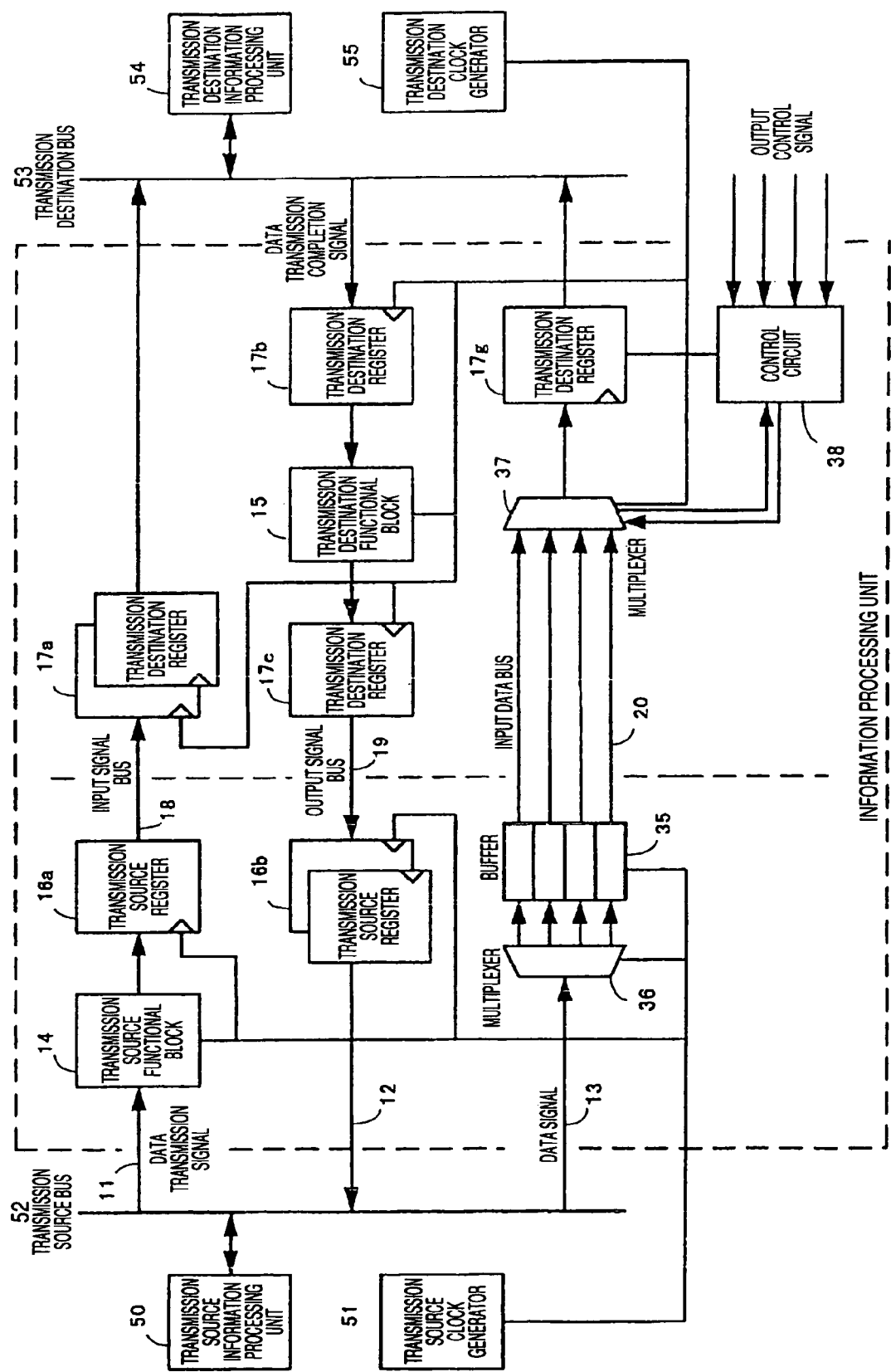
FIG. 13 is a block diagram showing the schematic configuration of an information processing unit in a seventh embodiment of the invention.
Figure 14:
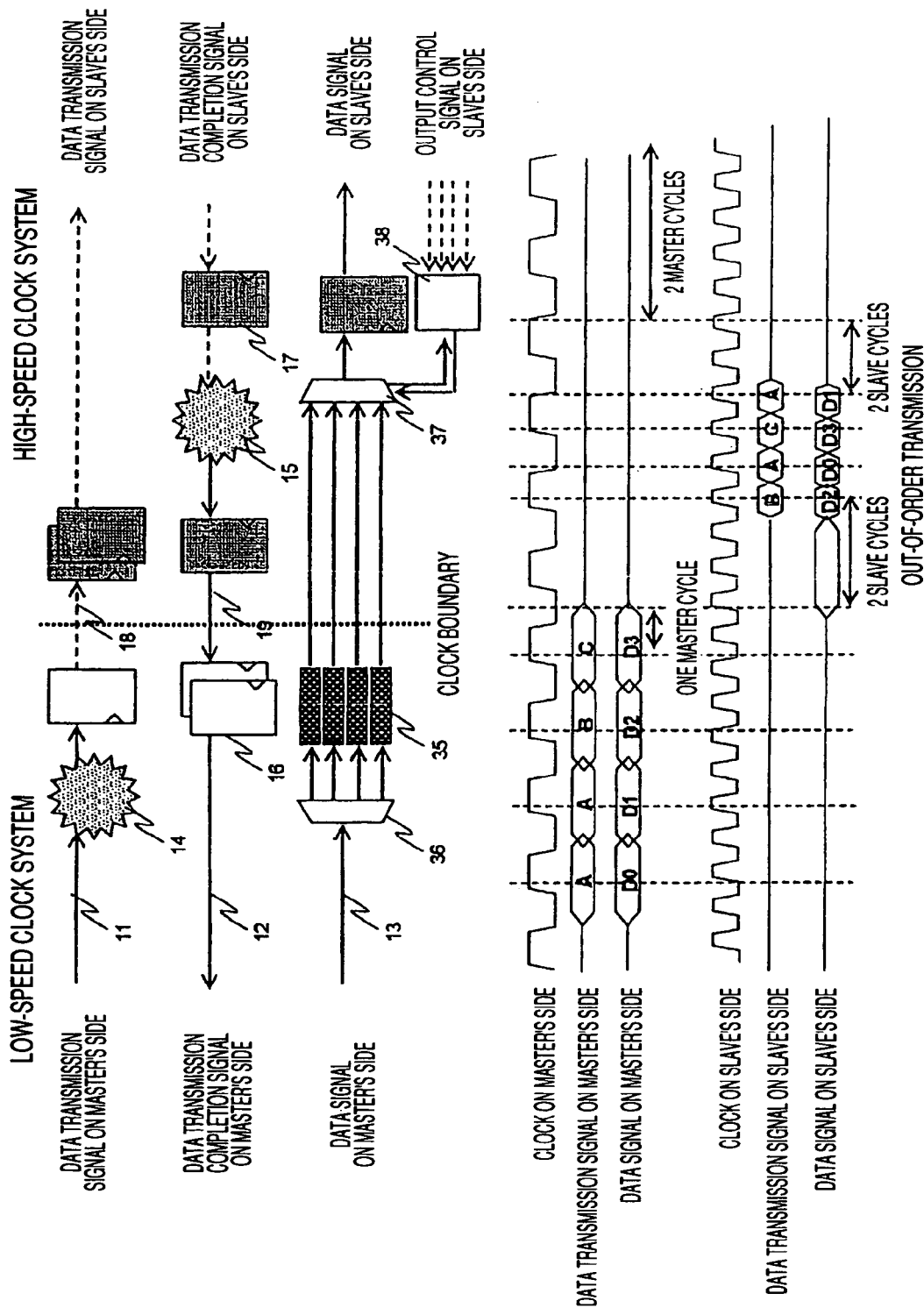
FIG. 14 is a time chart of the information processing unit in the seventh embodiment of the invention.

FIG. 13 is a block diagram showing the schematic configuration of an information processing unit for explaining a seventh embodiment of the invention and FIG. 14 is a time chart for explaining the operation. As the same reference number as that in the first embodiment denotes the same component in FIGS. 13 and 14, the detailed description is omitted.

The information processing unit equivalent to this embodiment allows setting a rule to prohibit the change of sequence beforehand and enables the master to prohibit the change of the sequence. The information processing unit equivalent to this embodiment includes a buffer 35 for holding transmission data allocated every thread ID, a multiplexer 36 for allocating the transmission data every thread ID, a multiplexer 37 for selecting the transmission data output from the buffer 35 according to a control signal from a control circuit 38 and the control circuit 38 for controlling the multiplexer 37 according to data reception setup completion notice from the slave's side, access control from the master's side and priority.

The operation of the information processing unit configured as described above will be described below. The master transmits data to the slave continuously four times. A data transmission signal and a data signal are simultaneously issued from the master's side, the data transmission signal is converted to a protocol on the slave's side by a functional block 14, it takes one master cycle to a clock boundary, and it takes two slave cycles from the boundary to the slave's side.

When the slave accepts the data transmission signal, it starts data reception as soon as the slave gets ready for data reception. After data reception, a data transmission completion signal is converted to a protocol on the master's side by a functional block 15, it takes two slave cycles to the clock boundary, and it takes two master cycles from the clock boundary to the master's side. As soon as the master receives the data transmission completion signal, it performs the next data transmission.

As to a data signal, it takes one master cycle from the master's side to the clock boundary, the multiplexer 36 stores all four consecutive data in each buffer 35 every thread ID, and continues to transmit all the four consecutive data to the slave's side. As soon as each slave gets ready for data reception, access permission notice is transmitted to the control circuit 38 and a control signal for access control over the slave is input to the multiplexer 37 according to access control from the master which is transmitted from the multiplexer 37 and priority. The multiplexer 37 selects data to each slave any time and transmits the selected data. It takes one slave cycle from the boundary to the slave's side.

According to this embodiment, as the frequency of the issue of the data transmission completion signal every data is reduced and a master's process having constraint on time is efficiently allocated, the real time of the master can be assured and data transmission efficiency can be enhanced.

In this embodiment, the case that the clock on the master's side is slower than the clock on the slave's side is adopted as an example, however, this embodiment can be applied independent of a condition on the clocks between the master and the slave. This embodiment may be also used together with the fourth, fifth or sixth embodiment or the eighth, ninth or tenth embodiment.

Eighth Embodiment

Figure 15:
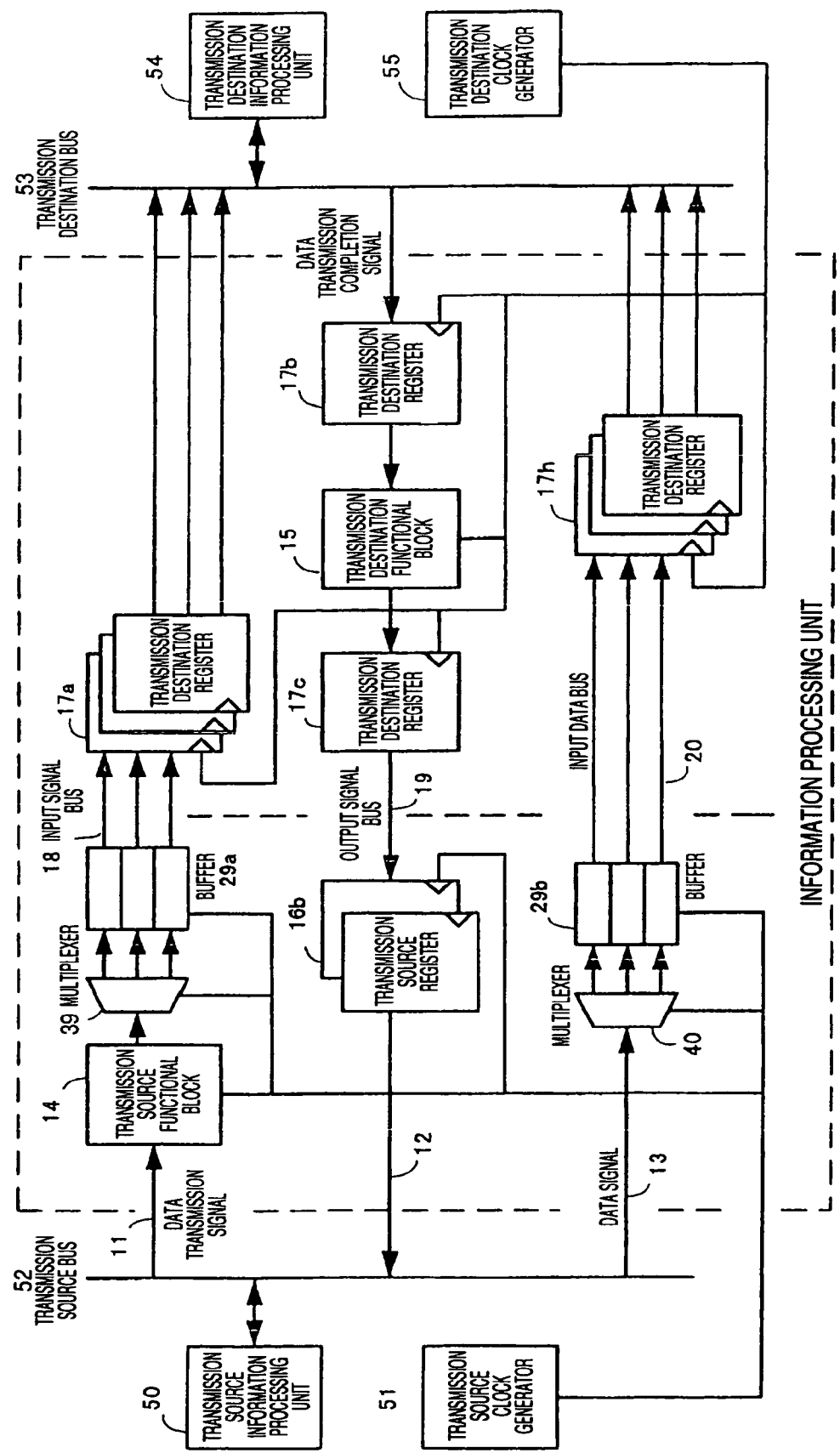
FIG. 15 is a block diagram showing the schematic configuration of an information processing unit in an eighth embodiment of the invention.
Figure 16:
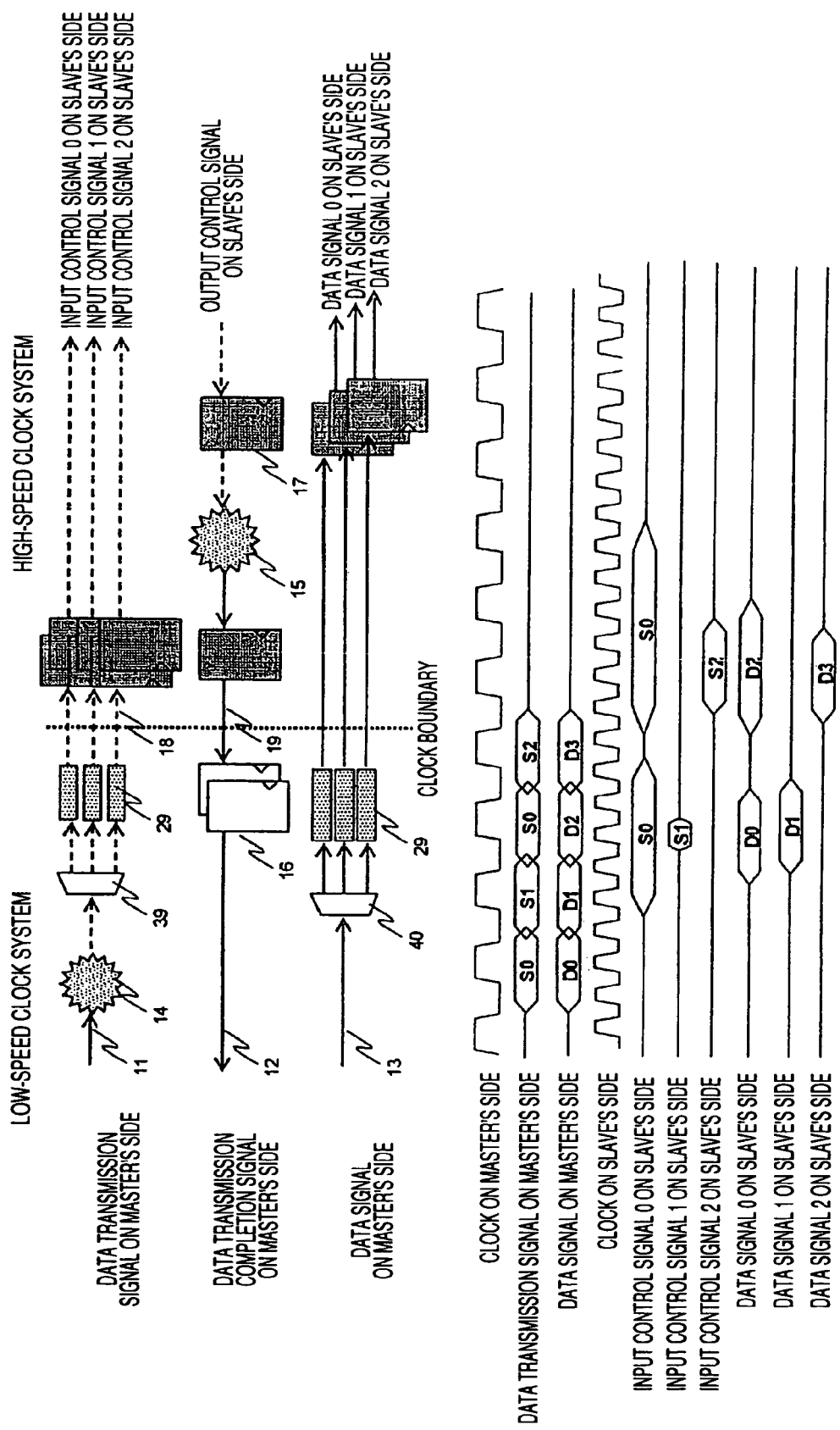
FIG. 16 is a time chart of the information processing unit in the eighth embodiment of the invention.

FIG. 15 is a block diagram showing the schematic configuration of an information processing unit for explaining an eighth embodiment of the invention and FIG. 16 is a time chart for explaining the operation. As the same reference number as that in the first embodiment denotes the same component in FIGS. 15 and 16, the detailed description is omitted.

The information processing unit equivalent to this embodiment transmits plural data transmission signals in a burst mode to reduce the frequency of the issue of a data transmission completion signal and includes a multiplexer 39 for allocating a data transmission signal every slave and a multiplexer 40 for allocating a data signal every slave.

The operation of the information processing unit configured as described above will be described below. Data transmission from the mater's side to the slave's side is performed continuously four times. A data transmission signal and a data signal are simultaneously issued from the master's side, the data transmission signal is converted to a protocol on the slave's side by a functional block 14, it takes one master cycle to a clock boundary, the multiplexer 39 allocates the data transmission signals every slave and holds the data transmission signals in a buffer 29. Afterward, the data transmission signals continue to be transmitted from the buffer 29 to the slave's side using respective data transmission signal buses. It takes two slave cycles from the boundary to the slave's side.

When the slave accepts the data transmission signal, it starts data reception as soon as the slave gets ready for data reception. After data reception, a data transmission completion signal is converted to a protocol on the master's side by a functional block 15, it takes two slave cycles to a clock boundary, and it takes two master cycles from the clock boundary to the master's side. As soon as the master receives the data transmission completion signal, it performs the next data transmission.

As to a data signal, it takes one master cycle from the master's side to the clock boundary, the multiplexer 40 stores all four consecutive data in each buffer every slave and continues to transmit all the four consecutive data to the slave's side using respective data signal buses.

As soon as each slave gets ready for data reception, data reception is performed without contention between slaves. It takes one slave cycle from the boundary to the slave's side. According to this embodiment, bus contention between slaves is eliminated by reducing the frequency of the issue of the data transmission completion signal every data and providing a data signal bus dedicated to each slave and data transmission efficiency can be enhanced.

In this embodiment, the case that the clock on the master's side is slower than the clock on the slave's side is adopted as an example, however, this embodiment can be applied independent of a condition on the clocks between the master and the slave. This embodiment may be also used together with the fourth, fifth, sixth or seventh embodiment or the ninth or tenth embodiment.

Ninth Embodiment

Figure 17:
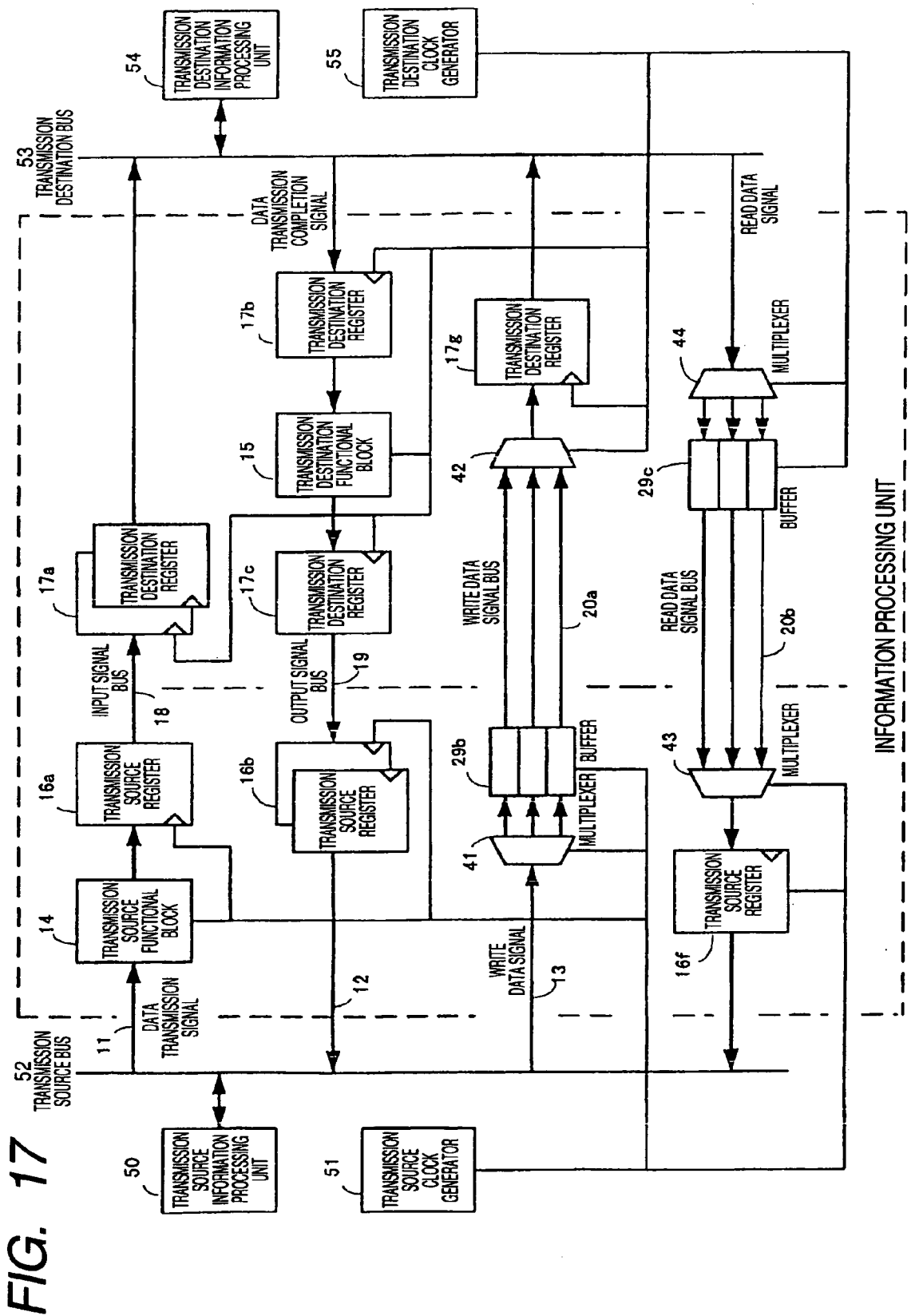
FIG. 17 is a block diagram showing the schematic configuration of an information processing unit in a ninth embodiment of the invention.
Figure 18:
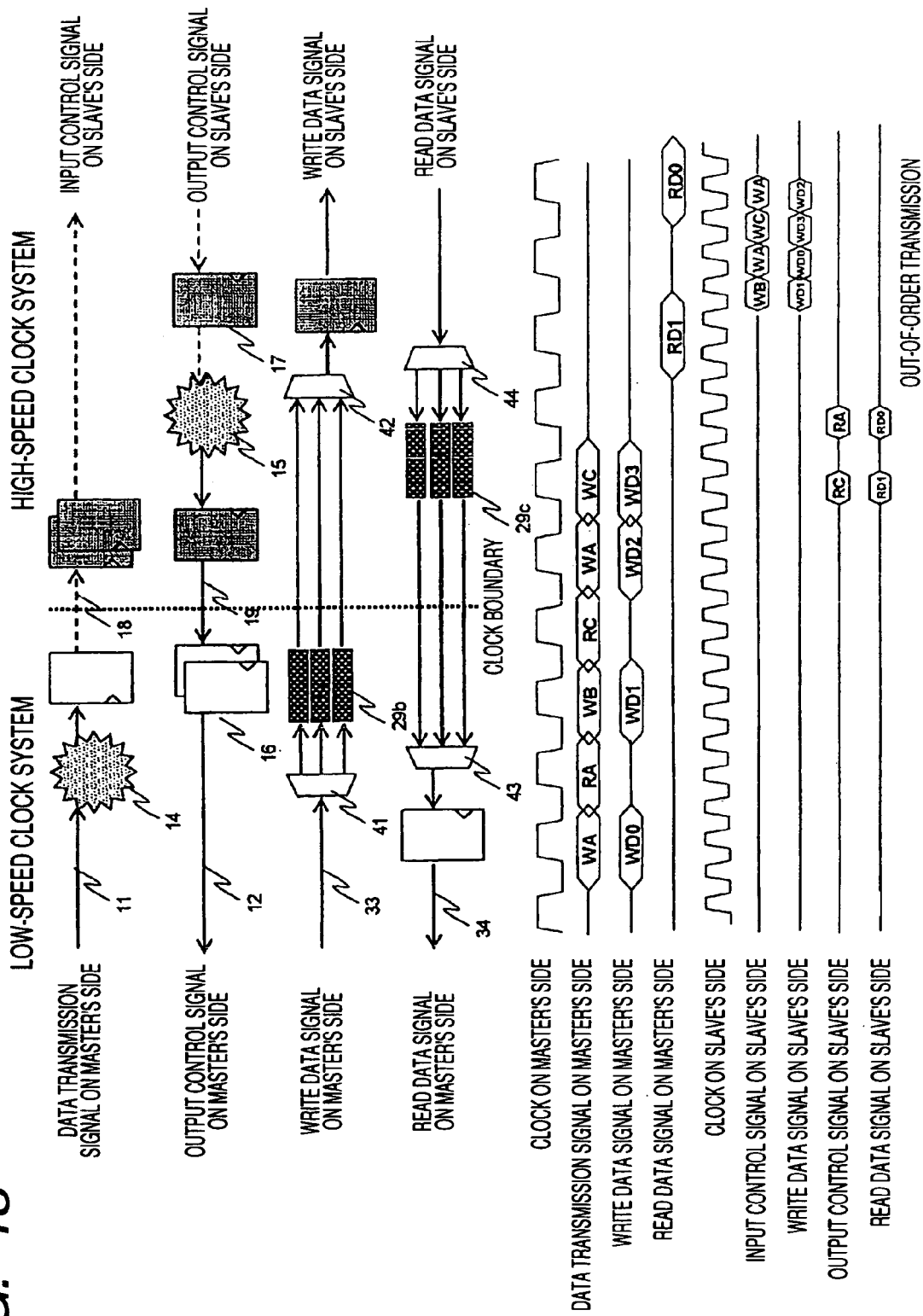
FIG. 18 is a time chart of the information processing unit in the ninth embodiment of the invention.

FIG. 17 is a block diagram showing the schematic configuration of an information processing unit for explaining a ninth embodiment of the invention and FIG. 18 is a time chart for explaining the operation. As the same reference number as that in the first embodiment denotes the same component in FIGS. 17 and 18, the detailed description is omitted.

The information processing unit equivalent to this embodiment can be applied to a case that a write data signal and a read data signal are transmitted/received and as ID of a write data signal is attached to a read data signal transmitted from the slave's side to the master's side, the master can recognize the read data signal corresponding to the write data signal with ID.

The information processing unit equivalent to this embodiment includes a multiplexer 41 for allocating a write data signal every slave, a multiplexer 42 for selecting write data from each buffer 29b, a multiplexer 43 for selecting read data from each buffer 29c and a multiplexer 44 for allocating a read data signal every master. The master and the slave both premise out-of-order correspondence and in this embodiment, a case that a clock on the master's side is slower than a clock on the slave's side is adopted as an example as in the first embodiment.

The operation of the information processing unit configured as described above will be described below. Data is written/read between the master and the slave. A data transmission signal and a data signal are simultaneously issued from the master's side, the data transmission signal is converted to a protocol on the slave's side by a functional block 14, it takes one master cycle to a clock boundary, and it takes two slave cycles from the boundary to the slave's side.

When the slave accepts the data transmission signal, it starts data reception as soon as the slave gets ready for data reception. After data reception, a data transmission completion signal is converted to a protocol on the master's side by a functional block 15, it takes two slave cycles to the clock boundary, and it takes two master cycles from the clock boundary to the master's side. As soon as the master receives the data transmission completion signal, it performs the next data transmission.

As to a data signal, it takes one master cycle from the master's side to the clock boundary, the multiplexer 41 stores write data in each buffer 29b and continues to transmit the write data to the slave's side. As soon as the slave gets ready for receiving the write data, the multiplexer 42 selects any time independent of the sequence of data transmission and performs data transmission. It takes one slave cycle from the boundary to the slave's side.

Similarly, as to read data transmission, the similar processing is also executed. According to this embodiment, as the master and the slave can both transmit/receive data independent of the sequence of the issue of data by reducing the frequency of the issue of the data transmission completion signal every data and providing the buffer, data transmission efficiency can be enhanced.

In this embodiment, a case that a clock on the master's side is slower than a clock on the slave's side is adopted as an example, however, this embodiment can be applied independent of a condition on the clocks between the master and the slave. This embodiment may be also used together with the fourth, fifth, sixth, seventh or eighth embodiment or the tenth embodiment.

Tenth Embodiment

Figure 19:
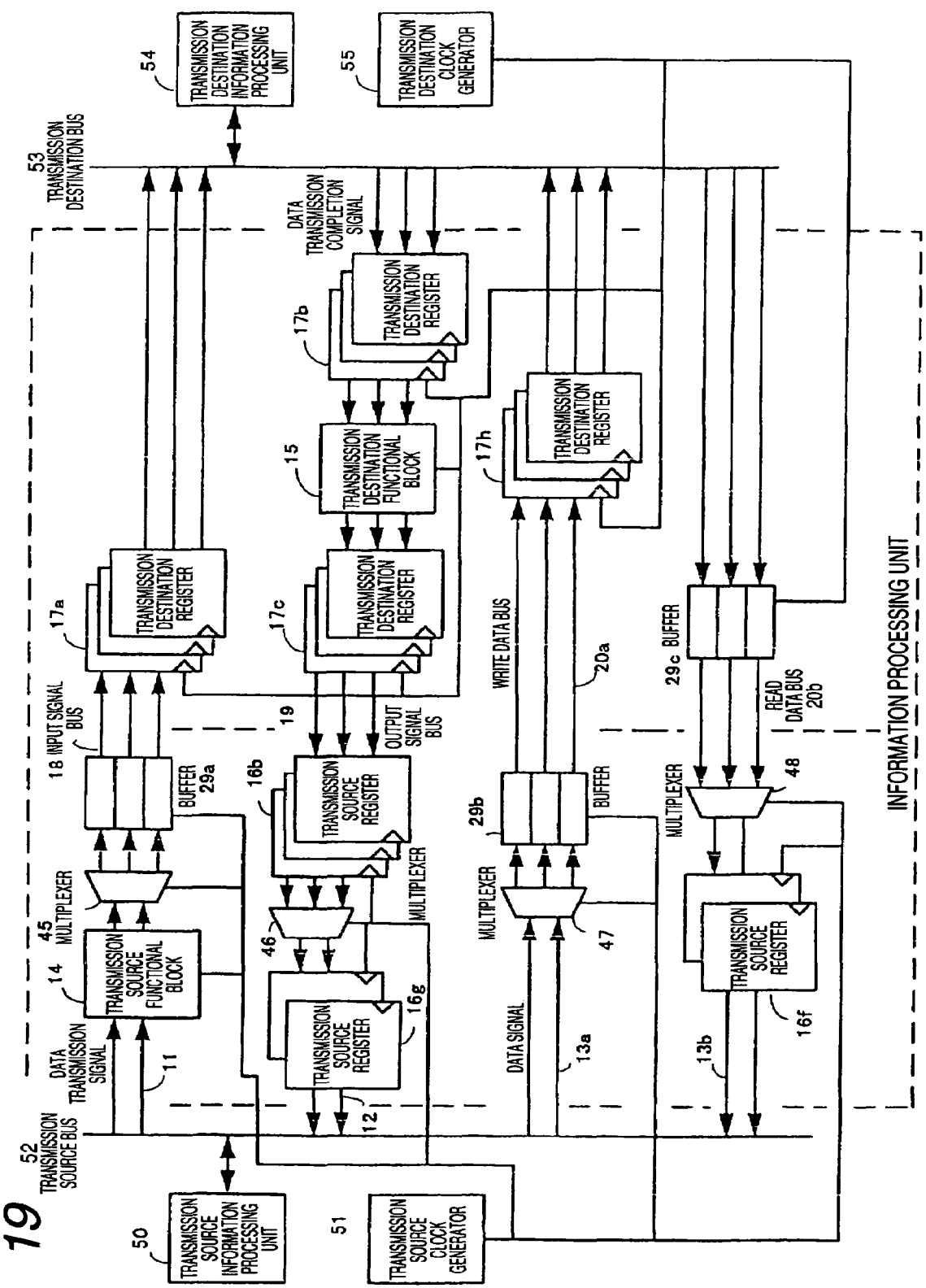
FIG. 19 is a block diagram showing the schematic configuration of an information processing unit in a tenth embodiment of the invention.
Figure 20:
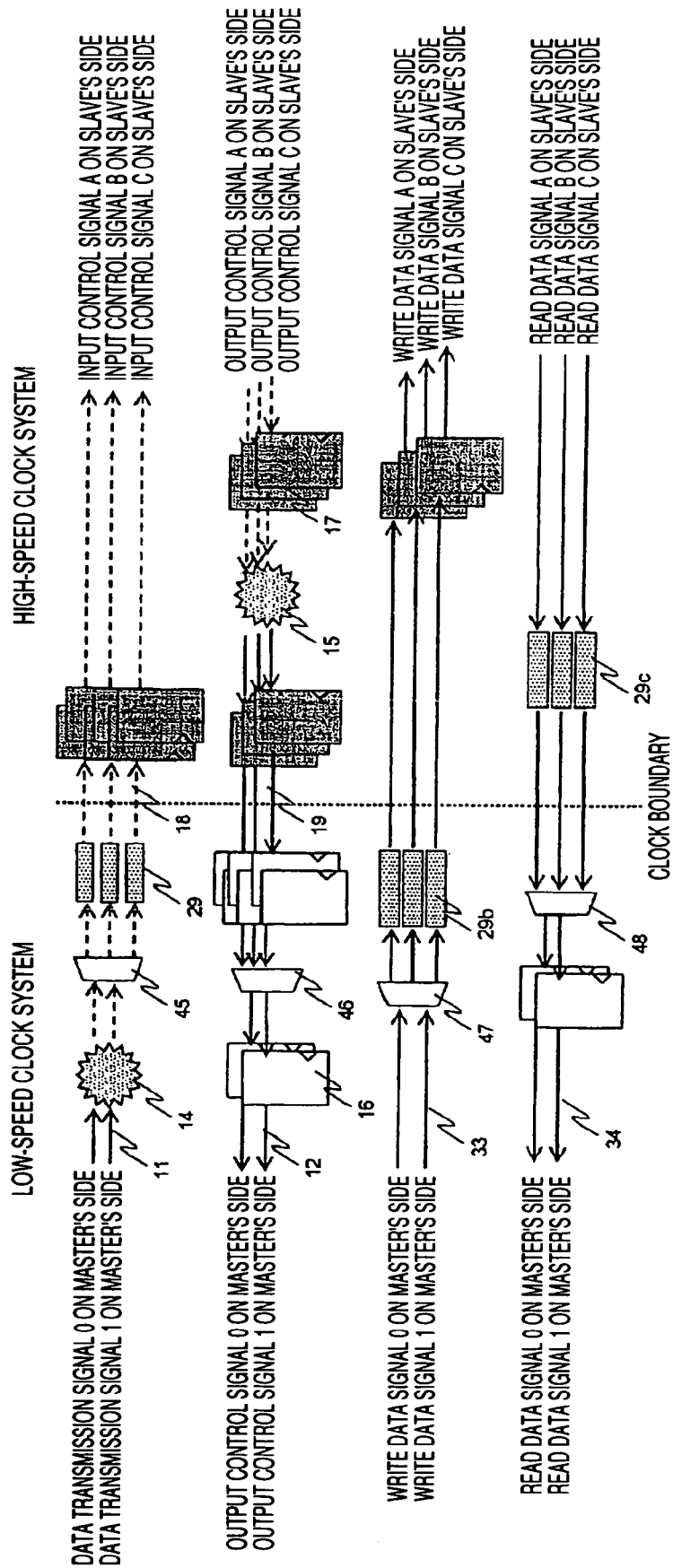
FIG. 20 is a block diagram showing relation among signals of the information processing unit in the tenth embodiment of the invention.
Figure 21:
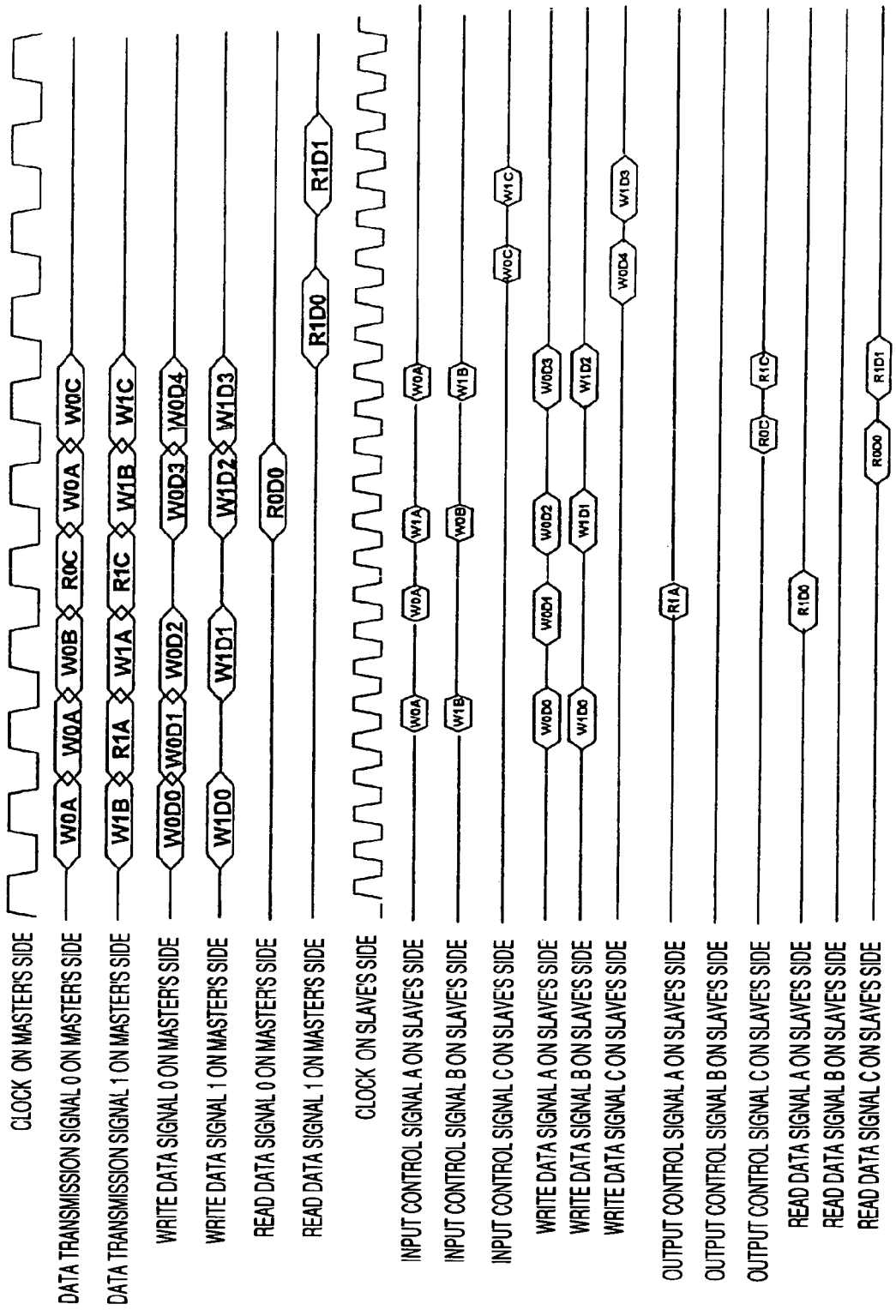
FIG. 21 is a time chart of the information processing unit in the tenth embodiment of the invention.
Figure 22:
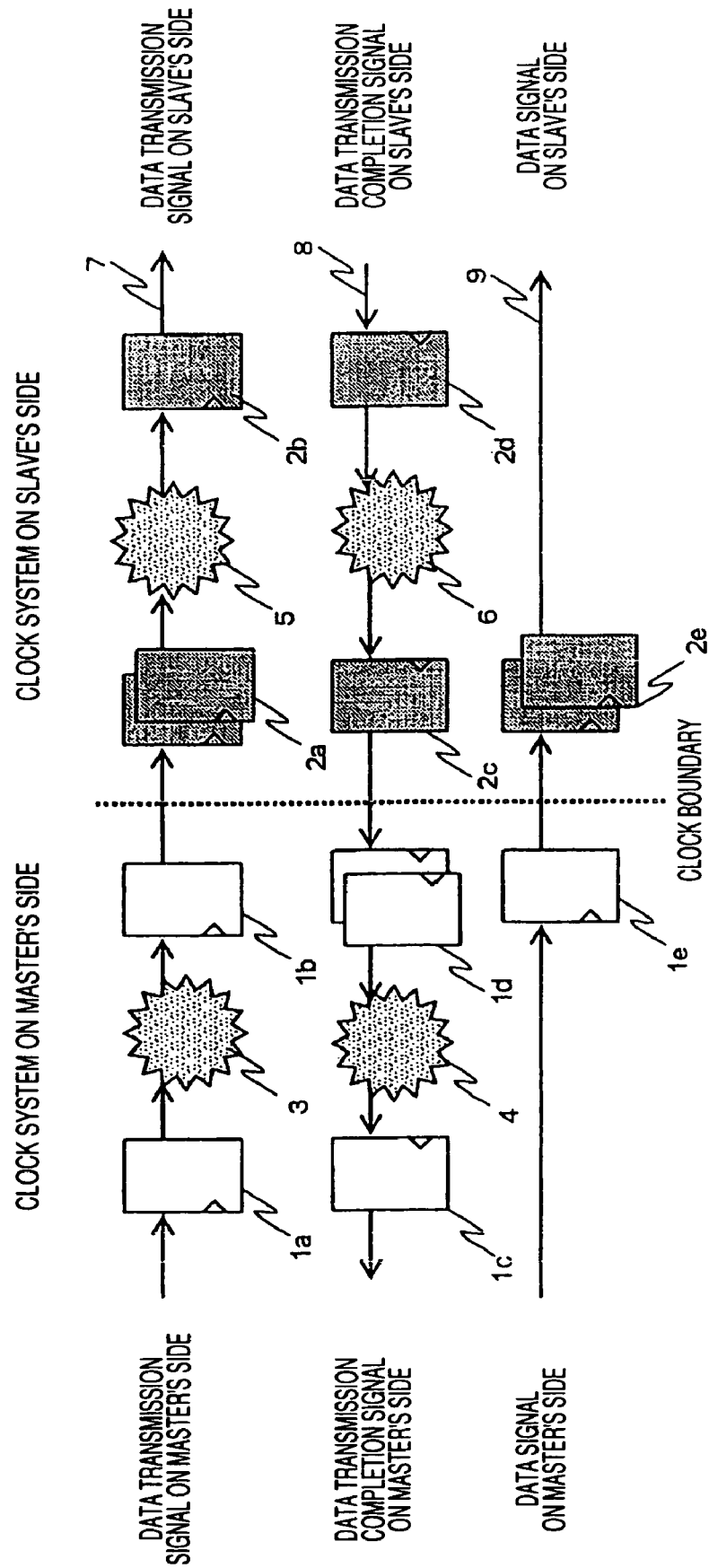
FIG. 22 is a block diagram showing the configuration of an information transmitter of a conventional type information processing unit.
Figure 23:
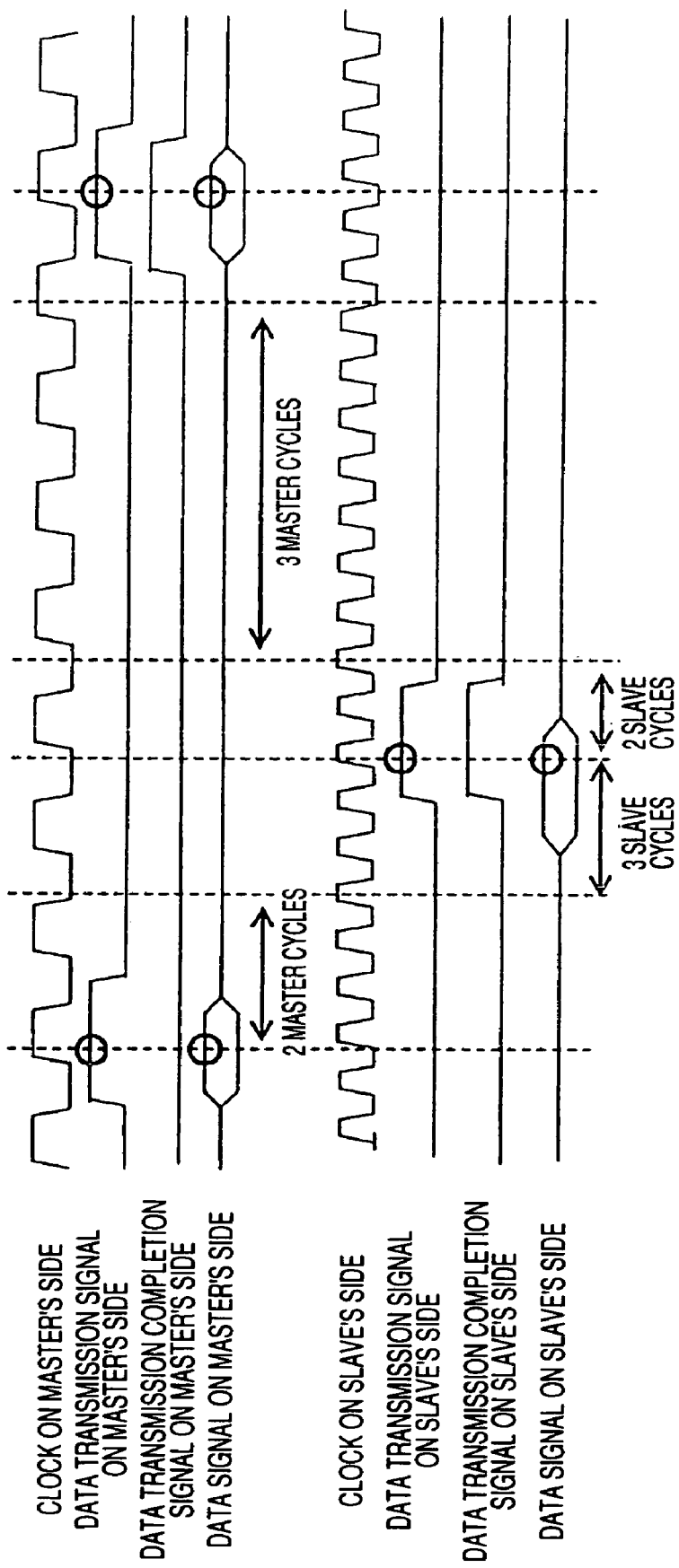
FIG. 23 is a time chart of the information transmitter of the conventional type information processing unit.
Figure 24:
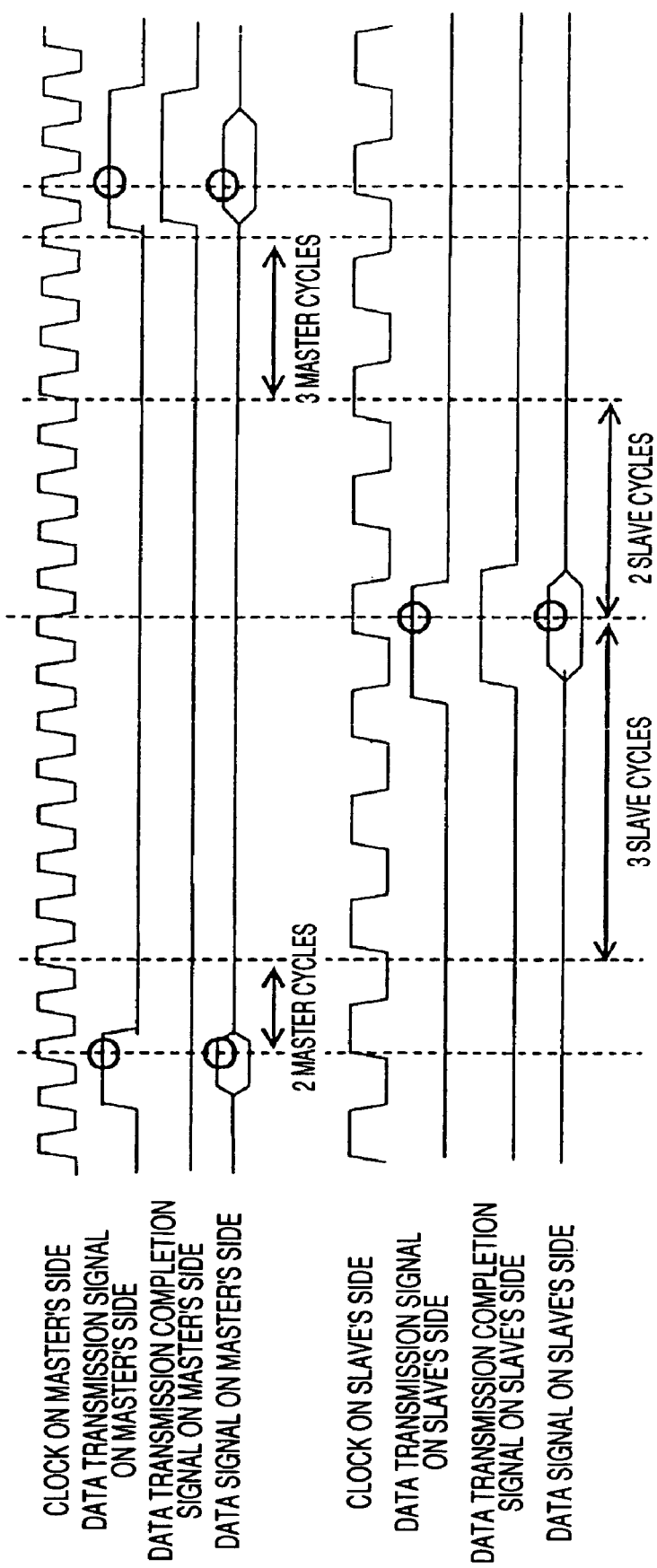
FIG. 24 is a time chart of the information transmitter of the conventional type information processing unit.
Figure 25:
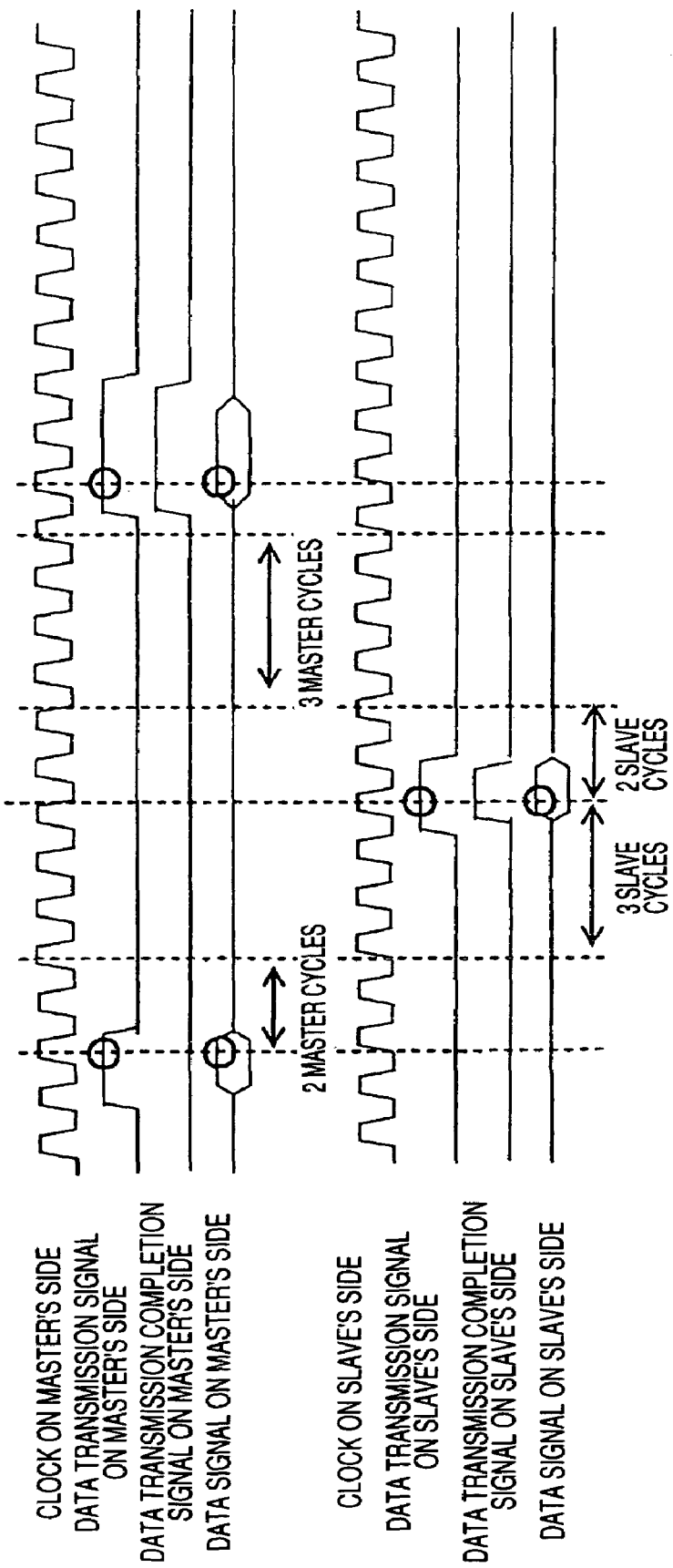
FIG. 25 is a time chart of the information transmitter of the conventional type information processing unit.

FIGS. 19 and 20 are block diagrams showing the schematic configuration of an information processing unit for explaining a tenth embodiment of the invention and FIG. 21 is a time chart showing their data transmission situations. As the same reference number as that in the first embodiment denotes the same component in this embodiment, the detailed description is omitted.

The information processing unit equivalent to this embodiment is provided with plural transmission paths of a data transmission signal and a data signal and includes a multiplexer 45 for allocating a write data signal every slave, a multiplexer 46 for selecting a slave output signal, a multiplexer 47 for allocating write data signals of plural masters every slave and a multiplexer 48 for allocating a read data signal every master. A case that a clock on the master's side is slower than a clock on the slave's side is adopted as an example as in the first embodiment.

The operation of the information processing unit configured as described above will be described below. Data is written/read between plural masters and plural slaves. A data transmission signal and a data signal are simultaneously issued from the master's side, the data transmission signal is converted to a protocol on the slave's side by a functional block 14, it takes one master cycle to a clock boundary, the multiplexer 45 allocates the data transmission signal every slave and holds it in the buffer 29. Afterward, the buffer 29 continues to transmit it to the slave's side using respective data transmission signal buses. It takes two slave cycles from the boundary to the slave's side.

When the slave accepts the data transmission signal, it starts data reception as soon as the slave gets ready for data reception. After data reception, a slave control output signal is converted to a protocol on the master's side using respective slave control output signal buses by a functional block 15, it takes two slave cycles to the clock boundary, and the slave control output signal is transmitted to the corresponding master by the multiplexer 46. It takes two master cycles from the clock boundary to the master's side. As soon as the master receives the slave control output signal, it performs the next data transmission.

As to the write data signal, it takes one master cycle from the master's side to the clock boundary, the multiplexer 47 stores write data in each buffer 29b every slave and continues to transmit the write data to the slave's side using respective write data signal buses. As each slave gets ready for data reception, each slave performs data reception without contention between slaves. It takes one slave cycle from the boundary to the slave's side.

Similarly, as to the read data signal, it takes one slave cycle from the slave's side to the clock boundary, read data is transmitted using respective slaves' read data signal buses and is stored in the buffer 29c. The multiplexer 48 allocates the read data every master and it takes one master cycle from the clock boundary to the master's side.

According to this embodiment, bus contention between slaves is reduced by reducing the frequency of the issue of a data transmission completion signal every data and providing a master-dedicated data signal bus and a slave-dedicated data signal bus and data transmission efficiency can be enhanced.

In this embodiment, a case that the clock on the master's side is slower than the clock on the slave's side is adopted as an example, however, this embodiment can be applied independent of a condition on the clocks between the master and the slave. This embodiment may be also used together with the fourth, fifth, sixth, seventh, eighth or ninth embodiment.

The information processing unit according to the invention is useful as an information processing unit provided with effect that signal control cycles are reduced and the data transmission efficiency can be enhanced by arranging the protocol conversion logic according to the clock frequency of the transmission source (the master) or the transmission destination (the slave) and providing the transmission destination maximum data bus size buffer and the transmission source maximum continuous transmission buffer and provided with the asynchronous protocol conversion function.

What is claimed is:

1. An information processing unit in which in case a data signal is asynchronously transmitted from a transmission source to a transmission destination which is different in a protocol, a data transmission signal is transmitted from the transmission source to the transmission destination beforehand and a data transmission completion signal is transmitted from the transmission destination to the transmission source after the transmission of the data signal is completed, comprising:

a transmission source functional block, controlled by a clock of the transmission source for converting the data transmission signal issued by the transmission source to a protocol of the transmission destination;

a first transmission source register, which is controlled by the clock of the transmission source and to which the data transmission signal output from the transmission source functional block is input;

an input signal bus, provided on a boundary between the clock of the transmission source and a clock of the transmission destination for converting the data transmission signal from the clock of the transmission source to the clock of the transmission destination;

a first transmission destination register, which is controlled by the clock of the transmission destination and to which the data transmission signal that passes the input signal bus is input;

a second transmission destination register, which is controlled by the clock of the transmission destination and to which the data transmission completion signal issued by the transmission destination is input;

a transmission destination functional block, controlled by the clock of the transmission destination for converting the data transmission completion signal output from the second transmission destination register to the protocol of the transmission source;

a third transmission destination register, which is controlled by the clock of the transmission destination and to which the data transmission completion signal output from the transmission destination functional block is input;

an output signal bus, provided on the boundary between the clock of the transmission destination and the clock of the transmission source for converting the data transmission completion signal from the clock of the transmission destination to the clock of the transmission source;

a second transmission source register, which is controlled by the clock of the transmission source and to which the data transmission completion signal that passes the output signal bus is input;

a third transmission source register, which is controlled by the clock of the transmission source and to which the data signal issued by the transmission source is input;

an input data bus, provided on the boundary between the clock of the transmission source and the clock of the transmission destination for converting the data signal from the clock of the transmission source to the clock of the transmission destination;

a fourth transmission destination register, which is controlled by the clock of the transmission destination and to which the data signal that passes the input data bus is input;

a transmission source multiplexer controlled by a clock of the transmission source for selecting the data signal issued by the transmission source every transmission;

a buffer controlled by the clock of the transmission source and having size equal to the maximum burst size of the transmission source for holding the data signal output from the transmission source multiplexer;

a transmission destination multiplexer controlled by a clock of the transmission destination for selecting the data signal output from the buffer every transmission; and a transmission destination register which is controlled by the clock of the transmission destination and to which the data signal output from the transmission destination multiplexer is input.

2. An information processing unit in which in case a data signal is asynchronously transmitted from a transmission source to a transmission destination which is different in a protocol, a data transmission signal is transmitted from the transmission source to the transmission destination beforehand and a data transmission completion signal is transmitted from the transmission destination to the transmission source after the transmission of the data signal is completed, comprising:

a transmission source functional block, controlled by a clock of the transmission source for converting the data transmission signal issued by the transmission source to a protocol of the transmission destination;

a first transmission source register, which is controlled by the clock of the transmission source and to which the data transmission signal output from the transmission source functional block is input;

an input signal bus, provided on a boundary between the clock of the transmission source and a clock of the transmission destination for converting the data transmission signal from the clock of the transmission source to the clock of the transmission destination;

a first transmission destination register, which is controlled by the clock of the transmission destination and to which the data transmission signal that passes the input signal bus is input;

a second transmission destination register, which is controlled by the clock of the transmission destination and to which the data transmission completion signal issued by the transmission destination is input;

a transmission destination functional block, controlled by the clock of the transmission destination for converting the data transmission completion signal output from the second transmission destination register to the protocol of the transmission source;

a third transmission destination register, which is controlled by the clock of the transmission destination and to which the data transmission completion signal output from the transmission destination functional block is input;

an output signal bus, provided on the boundary between the clock of the transmission destination and the clock of the transmission source for converting the data transmission completion signal from the clock of the transmission destination to the clock of the transmission source;

a second transmission source register, which is controlled by the clock of the transmission source and to which the data transmission completion signal that passes the output signal bus is input;

a third transmission source register, which is controlled by the dock of the transmission source and to which the data signal issued by the transmission source is input;

an input data bus, provided on the boundary between the clock of the transmission source and the clock of the transmission destination for converting the data signal from the clock of the transmission source to the clock of the transmission destination;

a fourth transmission destination register, which is controlled by the clock of the transmission destination and to which the data signal that passes the input data bus is input;

a transmission source multiplexer controlled by a clock of the transmission source for selecting the data signal issued by the transmission source with an allocated slave ID signal;

a buffer controlled by the clock of the transmission source for holding the data signal output from the transmission source multiplexer;

a first transmission destination multiplexer controlled by a clock of the transmission destination for selecting an output control signal of the transmission destination;

a second transmission destination multiplexer controlled by the clock of the transmission destination for selecting the data signal output from the buffer according to the output control signal supplied from the first transmission destination multiplexer; and a transmission destination register which is controlled by the clock of the transmission destination and to which the data signal output from the second transmission destination multiplexer is input.

3. An information processing unit in which in case a data signal is asynchronously transmitted from a transmission source to a transmission destination which is different in a protocol, a data transmission signal is transmitted from the transmission source to the transmission destination beforehand and a data transmission completion signal is transmitted from the transmission destination to the transmission source after the transmission of the data signal is completed, comprising:

a transmission source functional block, controlled by a clock of the transmission source for converting the data transmission signal issued by the transmission source to a protocol of the transmission destination;

a first transmission source register, which is controlled by the clock of the transmission source and to which the data transmission signal output from the transmission source functional block is input;

an input signal bus, provided on a boundary between the clock of the transmission source and a clock of the transmission destination for converting the data transmission signal from the clock of the transmission source to the clock of the transmission destination;

a first transmission destination register, which is controlled by the clock of the transmission destination and to which the data transmission signal that passes the input signal bus is input;

a second transmission destination register, which is controlled by the clock of the transmission destination and to which the data transmission completion signal issued by the transmission destination is input;

a transmission destination functional block, controlled by the clock of the transmission destination for converting the data transmission completion signal output from the second transmission destination register to the protocol of the transmission source;

a third transmission destination register, which is controlled by the clock of the transmission destination and to which the data transmission completion signal output from the transmission destination functional block is input;

an output signal bus, provided on the boundary between the clock of the transmission destination and the clock of the transmission source for converting the data transmission completion signal from the clock of the transmission destination to the clock of the transmission source;

a second transmission source register, which is controlled by the clock of the transmission source and to which the data transmission completion signal that passes the output signal bus is input;

a third transmission source register, which is controlled by the dock of the transmission source and to which the data signal issued by the transmission source is input;

an input data bus, provided on the boundary between the clock of the transmission source and the clock of the transmission destination for converting the data signal from the clock of the transmission source to the clock of the transmission destination;

a fourth transmission destination register, which is controlled by the clock of the transmission destination and to which the data signal that passes the input data bus is input;

a transmission source multiplexer controlled by a clock of the transmission source for selecting the data signal issued by the transmission source according to an allocated thread ID signal;

a buffer controlled by the clock of the transmission source for holding the data signal output from the transmission source multiplexer;

a control circuit controlled by a clock of the transmission destination for selecting an output control signal of the transmission destination based upon line boundary character check data transmitted from the transmission source;

a transmission destination multiplexer controlled by the clock of the transmission destination for selecting the data signal output from the buffer according to the output control signal supplied from the control circuit; and a transmission destination register which is controlled by the clock of the transmission destination and to which the data signal output from the transmission destination multiplexer is input.

4. An information processing unit in which in case a data signal is asynchronously transmitted from a transmission source to a transmission destination which is different in a protocol, a data transmission signal is transmitted from the transmission source to the transmission destination beforehand and a data transmission completion signal is transmitted from the transmission destination to the transmission source after the transmission of the data signal is completed, comprising:

a transmission source functional block, controlled by a clock of the transmission source for converting the data transmission signal issued by the transmission source to a protocol of the transmission destination;

a first transmission source register, which is controlled by the clock of the transmission source and to which the data transmission signal output from the transmission source functional block is input;

an input signal bus, provided on a boundary between the clock of the transmission source and a clock of the transmission destination for converting the data transmission signal from the clock of the transmission source to the clock of the transmission destination;

a first transmission destination register, which is controlled by the clock of the transmission destination and to which the data transmission signal that passes the input signal bus is input;

a second transmission destination register, which is controlled by the clock of the transmission destination and to which the data transmission completion signal issued by the transmission destination is input;

a transmission destination functional block, controlled by the clock of the transmission destination for converting the data transmission completion signal output from the second transmission destination register to the protocol of the transmission source;

a third transmission destination register, which is controlled by the clock of the transmission destination and to which the data transmission completion signal output from the transmission destination functional block is input;

an output signal bus, provided on the boundary between the clock of the transmission destination and the clock of the transmission source for converting the data transmission completion signal from the clock of the transmission destination to the clock of the transmission source;

a second transmission source register, which is controlled by the clock of the transmission source and to which the data transmission completion signal that passes the output signal bus is input;

a third transmission source register, which is controlled by the dock of the transmission source and to which the data signal issued by the transmission source is input;

an input data bus, provided on the boundary between the clock of the transmission source and the clock of the transmission destination for converting the data signal from the clock of the transmission source to the clock of the transmission destination;

a fourth transmission destination register, which is controlled by the clock of the transmission destination and to which the data signal that passes the input data bus is input;

a transmission source multiplexer controlled by a clock of the transmission source for allocating the data signal issued by the transmission source according to each transmission destination dedicated bus;

a buffer controlled by the dock of the transmission source for holding the data signal output from the transmission source multiplexer; and a transmission destination register which is controlled by a clock of the transmission destination, which is provided to each transmission destination dedicated bus and to which each data signal output from the buffer is input, wherein:

the input data bus includes an independent transmission destination dedicated bus every plural transmission destinations.

5. An information processing unit in which in case a data signal is asynchronously transmitted from a transmission source to a transmission destination which is different in a protocol, a data transmission signal is transmitted from the transmission source to the transmission destination beforehand and a data transmission completion signal is transmitted from the transmission destination to the transmission source after the transmission of the data signal is completed, comprising:

a transmission source functional block, controlled by a clock of the transmission source for converting the data transmission signal issued by the transmission source to a protocol of the transmission destination;

a first transmission source register, which is controlled by the clock of the transmission source and to which the data transmission signal output from the transmission source functional block is input;

an input signal bus, provided on a boundary between the clock of the transmission source and a clock of the transmission destination for converting the data transmission signal from the clock of the transmission source to the clock of the transmission destination;

a first transmission destination register, which is controlled by the clock of the transmission destination and to which the data transmission signal that passes the input signal bus is input;

a second transmission destination register, which is controlled by the clock of the transmission destination and to which the data transmission completion signal issued by the transmission destination is input;

a transmission destination functional block, controlled by the clock of the transmission destination for converting the data transmission completion signal output from the second transmission destination register to the protocol of the transmission source;

a third transmission destination register, which is controlled by the clock of the transmission destination and to which the data transmission completion signal output from the transmission destination functional block is input;

an output signal bus, provided on the boundary between the clock of the transmission destination and the clock of the transmission source for converting the data transmission completion signal from the clock of the transmission destination to the clock of the transmission source;

a second transmission source register, which is controlled by the clock of the transmission source and to which the data transmission completion signal that passes the output signal bus is input;

a third transmission source register, which is controlled by the dock of the transmission source and to which the data signal issued by the transmission source is input;

an input data bus, provided on the boundary between the clock of the transmission source and the clock of the transmission destination for converting the data signal from the clock of the transmission source to the clock of the transmission destination;

a fourth transmission destination register, which is controlled by the clock of the transmission destination and to which the data signal that passes the input data bus is input, wherein the data signal includes a write data signal and a read data signal, and the information processing unit further comprises:

a first transmission source multiplexer controlled by a clock of the transmission source for allocating the write data signal according to the transmission destination;

a transmission source buffer controlled by the clock of the transmission source for holding the write data signal output from the first transmission source multiplexer;

a first transmission destination multiplexer controlled by a clock of the transmission destination for selecting the write data signal output from the transmission source buffer according to an ID signal of the transmission destination;

a second transmission destination multiplexer controlled by the clock of the transmission destination for allocating the read data signal according to the transmission source;

a transmission destination buffer controlled by the clock of the transmission destination for holding the read data signal output from the second transmission destination multiplexer;

a second transmission source multiplexer controlled by the clock of the transmission source for selecting the read data signal output from the transmission destination buffer according to an ID signal of the transmission source; and a transmission destination register which is controlled by the clock of the transmission source and to which the read data signal output from the second transmission source multiplexer is input.

6. An information processing unit in which in case a data signal is asynchronously transmitted from a transmission source to a transmission destination which is different in a protocol, a data transmission signal is transmitted from the transmission source to the transmission destination beforehand and a data transmission completion signal is transmitted from the transmission destination to the transmission source after the transmission of the data signal is completed, comprising:

a transmission source functional block, controlled by a clock of the transmission source for converting the data transmission signal issued by the transmission source to a protocol of the transmission destination;

a first transmission source register, which is controlled by the clock of the transmission source and to which the data transmission signal output from the transmission source functional block is input;

an input signal bus, provided on a boundary between the clock of the transmission source and a clock of the transmission destination for converting the data transmission signal from the clock of the transmission source to the clock of the transmission destination;

a first transmission destination register, which is controlled by the clock of the transmission destination and to which the data transmission signal that passes the input signal bus is input;

a second transmission destination register, which is controlled by the clock of the transmission destination and to which the data transmission completion signal issued by the transmission destination is input;

a transmission destination functional block, controlled by the clock of the transmission destination for converting the data transmission completion signal output from the second transmission destination register to the protocol of the transmission source;

a third transmission destination register, which is controlled by the clock of the transmission destination and to which the data transmission completion signal output from the transmission destination functional block is input;

an output signal bus, provided on the boundary between the clock of the transmission destination and the clock of the transmission source for converting the data transmission completion signal from the clock of the transmission destination to the clock of the transmission a second transmission source register, which is controlled by the clock of the transmission source and to which the data transmission completion signal that passes the output signal bus is input;

a third transmission source register, which is controlled by the dock of the transmission source and to which the data signal issued by the transmission source is input;

an input data bus, provided on the boundary between the clock of the transmission source and the clock of the transmission destination for converting the data signal from the clock of the transmission source to the clock of the transmission destination; and a fourth transmission destination register, which is controlled by the clock of the transmission destination and to which the data signal that passes the input data bus is input, wherein the data signal includes a write data signal and a read data signal, and the information processing unit further comprises:

plural write data buses for transmitting the write data signal;

plural read data buses for transmitting the read data signal;

a first transmission source multiplexer controlled by a clock of the transmission source for allocating the write data signal according to the transmission destination;

a write data buffer controlled by the clock of the transmission source for holding the write data signal output from the first transmission source multiplexer;

a transmission destination register which is controlled by a clock of the transmission destination and to which the write data signal output from the write data buffer is input via the write data bus;

a read data buffer controlled by the clock of the transmission destination for holding the read data signal output from the transmission destination;

a second transmission source multiplexer controlled by the clock of the transmission source for selecting the read data signal supplied from the read data buffer via the read data bus according to the transmission source; and a transmission source register which is controlled by the clock of the transmission source and to which the read data signal output from the second transmission source multiplexer is input.

* * * * *